US008998718B2

(12) United States Patent
Inagaki et al.

(10) Patent No.: US 8,998,718 B2
(45) Date of Patent: Apr. 7, 2015

(54) IMAGE GENERATION SYSTEM, IMAGE GENERATION METHOD, AND INFORMATION STORAGE MEDIUM

(75) Inventors: Taketoshi Inagaki, Fujisawa (JP); Tadashi Sakakibara, Tokyo-to (JP); Kentaro Yamaguchi, Yokohama (JP)

(73) Assignee: Bandai Namco Games Inc., Tokyo (JP)

( * ) Notice: Subject to any disclaimer, the term of this patent is extended or adjusted under 35 U.S.C. 154(b) by 727 days.

(21) Appl. No.: 13/075,497

(22) Filed: Mar. 30, 2011

(65) Prior Publication Data

US 2011/0244959 A1    Oct. 6, 2011

(30) Foreign Application Priority Data

Mar. 31, 2010 (JP) ................................. 2010-083894

(51) Int. Cl.
*A63F 13/00* (2014.01)
*A63F 13/40* (2014.01)
*G06F 3/01* (2006.01)
*G06K 9/00* (2006.01)

(52) U.S. Cl.
CPC ......... *A63F 13/10* (2013.01); *A63F 2300/1093* (2013.01); *A63F 2300/6045* (2013.01); *G06F 3/017* (2013.01); *G06K 9/00355* (2013.01)

(58) Field of Classification Search
USPC .......................................................... 463/37
See application file for complete search history.

(56) References Cited

U.S. PATENT DOCUMENTS

| | | | | | |
|---|---|---|---|---|---|
| 6,128,004 | A | * | 10/2000 | McDowall et al. | 345/158 |
| 8,144,148 | B2 | * | 3/2012 | El Dokor et al. | 345/424 |
| 2004/0063481 | A1 | * | 4/2004 | Wang | 463/8 |
| 2006/0148563 | A1 | * | 7/2006 | Yang | 463/36 |
| 2006/0245649 | A1 | * | 11/2006 | Chen et al. | 382/173 |
| 2007/0285419 | A1 | | 12/2007 | Givon | |
| 2008/0212836 | A1 | * | 9/2008 | Fujimura et al. | 382/103 |
| 2008/0225041 | A1 | * | 9/2008 | El Dokor et al. | 345/419 |
| 2009/0042695 | A1 | | 2/2009 | Chien et al. | |
| 2009/0103780 | A1 | | 4/2009 | Nishihara et al. | |
| 2009/0217211 | A1 | * | 8/2009 | Hildreth et al. | 715/863 |
| 2010/0199231 | A1 | * | 8/2010 | Markovic et al. | 715/863 |
| 2010/0261526 | A1 | * | 10/2010 | Anderson et al. | 463/31 |
| 2011/0151974 | A1 | * | 6/2011 | Deaguero | 463/37 |

FOREIGN PATENT DOCUMENTS

JP    A-2008-136695    6/2008

OTHER PUBLICATIONS

IGN, "GDC 10: Motion Fighter Hands-On," http://www.ign.com/articles/2010/03/11/gdc-10-motion-fighter-hands-on, Published Mar. 10, 2010.*
Youtube, "PS MOVE motion fighters demo," https://www.youtube.com/watch?v=VhRLCILAGAY. Published Mar. 11, 2010.*
May 23, 2013 Search Report issued in European Patent Application 11160705.7-1905/2371434.

* cited by examiner

*Primary Examiner* — Reginald Renwick
(74) *Attorney, Agent, or Firm* — Oliff PLC

(57) ABSTRACT

An image generation system includes an image information acquisition section that acquires image information from an image sensor, a grasp motion determination section that determines whether or not a player has made a grasp motion with one hand that is a right hand or a left hand based on the image information, a grasp-linked motion determination section that determines whether or not the player has made a grasp-linked motion that follows the grasp motion with the other hand based on the image information when the grasp motion determination section has determined that the player has made the grasp motion with the one hand, and an image generation section that generates an image based on the determination results of the grasp motion and the grasp-linked motion.

30 Claims, 20 Drawing Sheets

S>VT

S<VT

DEPTH INFORMATION

SKELETON INFORMATION

DEPTH INFORMATION AND COLOR IMAGE INFORMATION

FIG. 18

| GRASP-LINKED MOTION PATTERN | ATTACK TYPE | ATTACK CAPABILITY (DAMAGE) | STIFF TIME | ... |
|---|---|---|---|---|
| PATTERN PA | ATTACK A | 8 | 9 | ... |
| PATTERN PB | ATTACK B | 4 | 4 | ... |
| PATTERN PC | ATTACK C | 5 | 5 | ... |
| ⋮ | ⋮ | ⋮ | ⋮ | ⋮ |

IMAGE GENERATION SYSTEM, IMAGE GENERATION METHOD, AND INFORMATION STORAGE MEDIUM

Japanese Patent Application No. 2010-83894 filed on Mar. 31, 2010, is hereby incorporated by reference in its entirety.

BACKGROUND

The present invention relates to an image generation system, an image generation method, an information storage medium, and the like.

A game device that allows the player to perform a game operation using a game controller provided with a motion sensor instead of a game controller provided with an operation button and a direction key, has been popular. A game device having such an operation interface allows the player to perform an intuitive operation input, and can simplify game operations, for example. JP-A-2008-136695 discloses a game device that enables such an intuitive interface, for example.

A wave motion of the hand of the player can be detected using a game controller provided with a motion sensor. However, it is difficult to detect a grasp motion of the player using such a game controller.

When the character corresponding to the player has stretched the arm toward the opposing character, it is difficult to determine whether or not the player has made a motion that grasps the opposing character.

When the player has made a grasp motion, it is necessary to determine a motion that is made by the player after the grasp motion. For example, the player may grasp the right shoulder of the opposing character with the left hand (one hand), and then attack the opposing character with the right hand (the other hand), or grasp the left shoulder of the opposing character with the right hand. Therefore, it is necessary to determine the motion that follows the grasp motion.

SUMMARY

According to one aspect of the invention, there is provided an image generation system comprising:

an image information acquisition section that acquires image information from an image sensor;

a grasp motion determination section that determines whether or not a player has made a grasp motion with one hand that is a right hand or a left hand based on the image information;

a grasp-linked motion determination section that determines whether or not the player has made a grasp-linked motion with the other hand based on the image information when the grasp motion determination section has determined that the player has made the grasp motion with the one hand, the grasp-linked motion being a motion that follows the grasp motion; and an image generation section that generates an image based on the determination results of the grasp motion and the grasp-linked motion.

According to another aspect of the invention, there is provided an image generation method comprising:

acquiring image information from an image sensor;

determining whether or not a player has made a grasp motion with one hand that is a right hand or a left hand based on the image information;

determining whether or not the player has made a grasp-linked motion with the other hand based on the image information when it has been determined that the player has made the grasp motion with the one hand, the grasp-linked motion being a motion that follows the grasp motion; and generating an image based on the determination results of the grasp motion and the grasp-linked motion.

According to another aspect of the invention, there is provided a computer-readable information storage medium storing a program that causes a computer to execute the above image generation method.

BRIEF DESCRIPTION OF THE DRAWINGS

FIG. 18 shows an example of attack calculation parameter table data.

DESCRIPTION OF EXEMPLARY EMBODIMENTS

Figure 1:
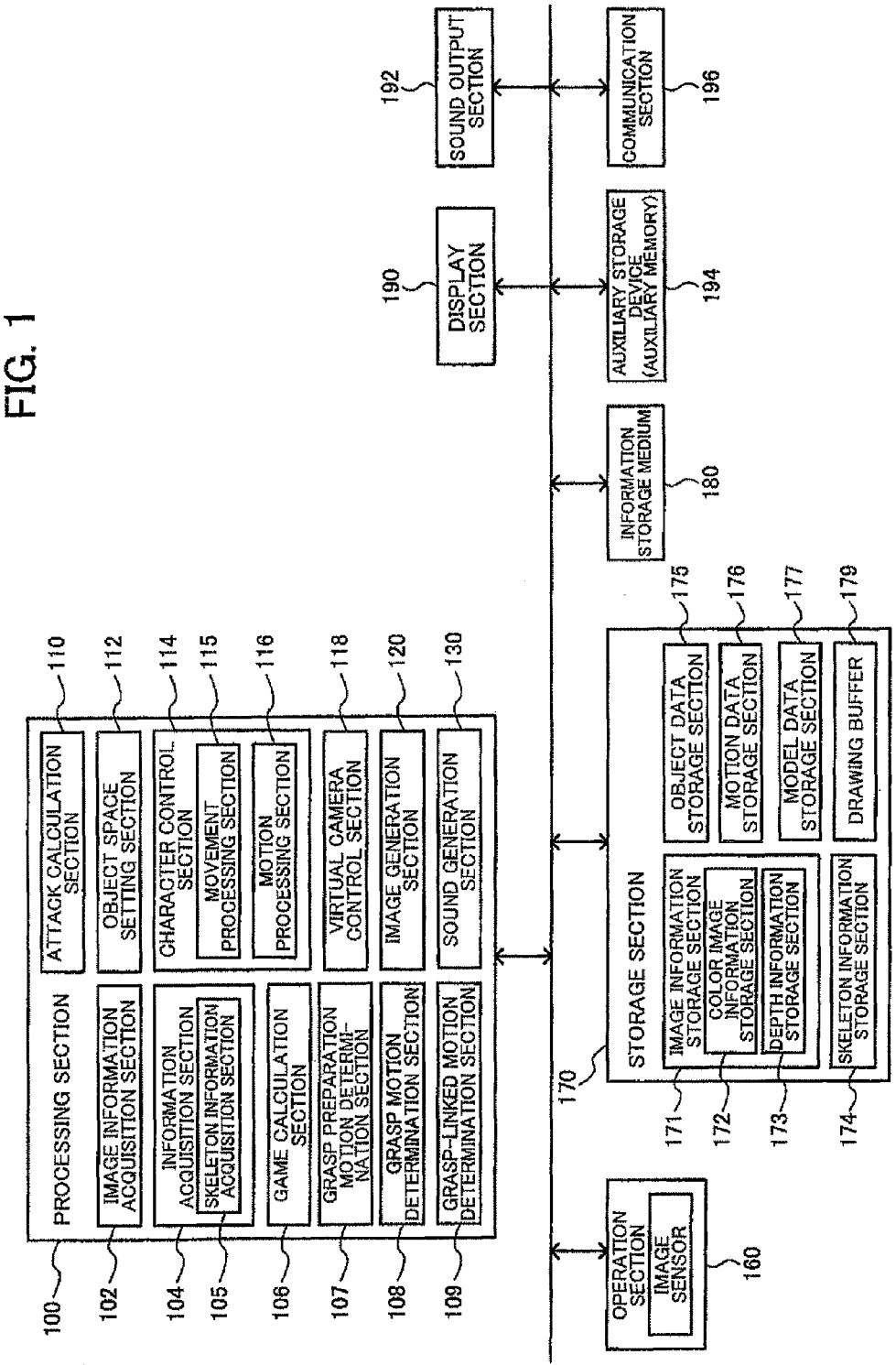
FIG. 1 shows a configuration example of an image generation system according to one embodiment of the invention.

Several aspects of the invention may provide an image generation system, an image generation method, an information storage medium, and the like that can detect a grasp motion and a grasp-linked motion of the player, and generate an image.

According to one embodiment of the invention, there is provided an image generation system comprising:

an image information acquisition section that acquires image information from an image sensor;

a grasp motion determination section that determines whether or not a player has made a grasp motion with one hand that is a right hand or a left hand based on the image information;

a grasp-linked motion determination section that determines whether or not the player has made a grasp-linked motion with the other hand based on the image information when the grasp motion determination section has determined that the player has made the grasp motion with the one hand, the grasp-linked motion being a motion that follows the grasp motion; and an image generation section that generates an image based on the determination results of the grasp motion and the grasp-linked motion.

According to this embodiment, whether or not the player has made a grasp motion with one hand is determined based on the image information from the image sensor. Whether or not the player has made a grasp-linked motion with the other hand is determined based on the image information when it has been determined that the player has made the grasp motion, and an image is generated based on the determination results for the grasp motion and the grasp-linked motion. According to this embodiment, whether or not the player has made a grasp motion and a grasp-linked motion that follows the grasp motion can be determined based on the image information from the image sensor. Therefore, the motion (movement) of the player is intuitively reflected in the generated image, so that an unprecedented image can be generated. Since the motion (movement) of the player is directly reflected in the image, the player is fully involved in virtual reality, for example. Moreover, various games that have been difficult to implement can be provided by determining the grasp-linked motion that follows the grasp motion, and the game development or the game process can be changed in various ways.

In the image generation system, the grasp-linked motion determination section may determine the grasp-linked motion among first to Mth grasp-linked motions (M is an integer equal to or larger than 2) that has been made by the player with the other hand based on the image information from the image sensor.

According to this configuration, since a grasp-linked motion among the first to Mth grasp-linked motions that has been made by the player can be determined, and an image can be generated based on the determination result, various grasp-linked motion images can be generated.

In the image generation system, the grasp-linked motion determination section may determine the grasp-linked motion among the first to Mth grasp-linked motions that has been made by the player with the other hand based on information about an image area corresponding to the other hand.

According to this configuration, the grasp-linked motion that has been made by the player can be determined by effectively utilizing the information about the image area corresponding to the other hand.

In the image generation system, the grasp-linked motion determination section may determine the grasp-linked motion among the first to Mth grasp-linked motions that has been made by the player with the other hand based on the information about the image area within a given period or at a given timing.

This prevents a situation in which the player is erroneously determined to have made a grasp-linked motion when the information about the image area has momentarily changed, for example, by determining the grasp-linked motion that has been made by the player based on the information about the image area within a given period. If the grasp-linked motion that has been made by the player is determined based on the information about the image area at the given timing, whether or not the grasp-linked motion has been successfully made can be determined at the given timing, for example. Therefore, a novel game can be provided, for example.

In the image generation system, the grasp-linked motion determination section may determine the grasp-linked motion among the first to Mth grasp-linked motions that has been made by the player with the other hand based on a size of the image area.

According to this configuration, the grasp-linked motion that has been made by the player can be determined by calculating the size of the image area by image processing. Therefore, the grasp-linked motion determination process can be implemented by simple image processing.

In the image generation system, the image information acquisition section may acquire color image information as the image information, the color image information being image information in which a color value is set to each pixel position; and the grasp-linked motion determination section may determine the grasp-linked motion among the first to Mth grasp-linked motions that has been made by the player with the other hand based on the size of the image area corresponding to the other hand in the color image information.

According to this configuration, the grasp-linked motion determination process can be implemented by image processing that utilizes the color image information acquired by the image sensor.

In the image generation system, the image information acquisition section may acquire depth image information as the image information, the depth information being image information in which a depth value is set to each pixel position; and the grasp-linked motion determination section may determine the grasp-linked motion among the first to Mth grasp-linked motions that has been made by the player with the other hand based on the size of the image area corresponding to the other hand in the depth information.

According to this configuration, the grasp-linked motion determination process can be implemented by image processing that utilizes the depth information acquired by the image sensor.

In the image generation system, the grasp-linked motion determination section may change a determination threshold value used when determining the size of the image area based on information about a distance between a display section that displays the generated image and the player.

This makes it possible to implement an accurate grasp-linked motion determination process even if the distance between the display section and the player has changed.

In the image generation system, the grasp-linked motion determination section may determine the grasp-linked motion among the first to Mth grasp-linked motions that has been made by the player with the other hand based on image information about a recognition member that is fitted to the hand of the player.

According to this configuration, since the grasp-linked motion determination process can be implemented using the image information about the recognition member, the accuracy of the determination process can be improved as compared with the case of using only an image of the hand of the player.

In the image generation system, the grasp-linked motion determination section may determine the grasp-linked motion among the first to Mth grasp-linked motions that has been made by the player with the other hand by a shape recognition process on image information about the other hand.

According to this configuration, when the player has made a grasp motion with one hand, the grasp-linked motion determination process can be implemented by performing the shape recognition process on the image of the other hand.

The image generation system may further comprise: an information acquisition section that acquires skeleton information based on the image information from the image sensor, the skeleton information specifying a motion of the player viewed from the image sensor, the grasp-linked motion determination section may determine the grasp-linked motion among the first to Mth grasp-linked motions that has been made by the player with the other hand based on the skeleton information.

According to this configuration, a grasp-linked motion among the first to Mth grasp-linked motions that has been made by the player with the other hand can be determined by effectively utilizing the skeleton information.

The image generation system may further comprise: an information acquisition section that acquires skeleton information based on the image information from the image sensor, the skeleton information specifying a motion of the player viewed from the image sensor, the grasp-linked motion determination section may determine whether or not the player has made the grasp-linked motion with the other hand based on the skeleton information.

According to this configuration, the grasp-linked motion determination process can be implemented by effectively utilizing the skeleton information.

The image generation system may further comprise: an information acquisition section that acquires skeleton information based on the image information from the image sensor, the skeleton information specifying a motion of the player viewed from the image sensor, the information acquisition section setting an image processing area for determining whether or not the player has made the grasp motion or the grasp-linked motion based on the acquired skeleton information.

According to this configuration, since it suffices to perform image processing on only the processing area, the processing load imposed by image processing can be reduced, and the grasp-linked motion determination process can be implemented with a reduced processing load.

The image generation system may comprise: a character control section that controls a character corresponding to the player, the image generation section may generate an image that indicates a state in which the character makes the grasp motion and the grasp-linked motion when it has been determined that the player has made the grasp motion and the grasp-linked motion.

According to this configuration, when the player has made a grasp motion and a grasp-linked motion, the character in the game space also makes a grasp motion and a grasp-linked motion. Therefore, the player is fully involved in virtual reality.

In the image generation system, the grasp-linked motion determination section may determine whether or not the player has made an attack motion with the other hand as the grasp-linked motion based on the image information from the image sensor.

This makes it possible to determine a series of motions (e.g., grasping the opposing character with one hand, and attacking the opposing character with the other hand), and generate the corresponding image.

The image generation system may further comprise: an attack calculation section that sets an attack calculation parameter of the attack motion with the other hand based on the image information from the image sensor, and performs an attack calculation process based on the attack calculation parameter.

The image information can be effectively utilized by utilizing the image information from the image sensor when setting the attack calculation parameter in addition to the case of determining whether or not the player has made a grasp motion or a grasp-linked motion.

The image generation system may further comprise: a grasp preparation motion determination section that determines whether or not the player has made a grasp preparation motion based on the image information, the grasp motion determination section may process an image corresponding to a hand of the player that has made the grasp preparation motion when the grasp preparation motion determination section has determined that the player has made the grasp preparation motion, and may determine whether or not the player has made the grasp motion that follows the grasp preparation motion based on the image processing result.

According to this configuration, whether or not the player has made a grasp preparation motion and a grasp motion that follows the grasp preparation motion can be determined based on the image information from the image sensor. Therefore, the motion (movement) of the player is intuitively reflected in the generated image, so that an unprecedented image can be generated.

In the image generation system, the grasp motion determination section may determine whether or not the player has made the grasp motion based on information about an image area corresponding to the hand of the player that has been determined to have made the grasp preparation motion.

According to this configuration, whether or not the player has made a grasp motion can be determined by effectively utilizing the information about the image area corresponding to the hand of the player that has been determined to have made the grasp preparation motion.

In the image generation system, the grasp motion determination section may determine whether or not the player has made the grasp motion based on the information about the image area within a given period or at a given timing.

This prevents a situation in which the player is erroneously determined to have made a grasp motion when the information about the image area has momentarily changed, for example, by determining whether or not the player has made a grasp motion based on the information about the image area within a given period. If whether or not the player has made a grasp motion is determined based on the information about the image area at the given timing, whether or not the grasp motion has been successfully made can be determined at the given timing, for example. Therefore, a novel game can be provided, for example.

In the image generation system, the grasp motion determination section may determine whether or not the player has made the grasp motion based on a size of the image area.

According to this configuration, whether or not the player has made a grasp motion can be determined by calculating the size of the image area by image processing. Therefore, the grasp motion determination process can be implemented by simple image processing.

In the image generation system, the grasp motion determination section may change a determination threshold value used when determining the size of the image area based on information about a distance between a display section that displays the generated image and the player.

This makes it possible to implement an accurate grasp motion determination process even if the distance between the display section and the player has changed.

In the image generation system, the grasp motion determination section may determine whether or not the player has made the grasp motion based on image information about a recognition member that is fitted to the hand of the player.

According to this configuration, since the grasp motion determination process can be implemented using the image information about the recognition member, the accuracy of the determination process can be improved as compared with the case of using only an image of the hand of the player.

In the image generation system, the grasp motion determination section may determine whether or not the player has made the grasp motion by a shape recognition process on image information about the hand of the player that has been determined to have made the grasp preparation motion.

According to this configuration, the grasp motion determination process can be implemented by detecting that the player has clenched the hand based on the shape recognition process, for example.

According to another embodiment of the invention, there is provided an image generation method comprising:

acquiring image information from an image sensor;

determining whether or not a player has made a grasp motion with one hand that is a right hand or a left hand based on the image information;

determining whether or not the player has made a grasp-linked motion with the other hand based on the image information when it has been determined that the player has made the grasp motion with the one hand, the grasp-linked motion being a motion that follows the grasp motion; and generating an image based on the determination results of the grasp motion and the grasp-linked motion.

According to another embodiment of the invention, there is provided a computer-readable information storage medium storing a program that causes a computer to execute the above image generation method.

Exemplary embodiments of the invention are described below. Note that the following exemplary embodiments do not in any way limit the scope of the invention laid out in the claims. Note also that all of the elements of the following exemplary embodiments should not necessarily be taken as essential elements of the invention.

1. Configuration

FIG. 1 shows an example of a block diagram of an image generation system (game device) according to one embodiment of the invention. Note that the image generation system according to this embodiment is not limited to the configuration shown in FIG. 1. Various modifications may be made, such as omitting some of the elements (sections) or adding other elements (sections).

An operation section 160 allows the player to input operation data. The function of the operation section 160 may be implemented by a direction key, an operation button, an analog stick, a lever, a sensor (e.g., angular speed sensor or acceleration sensor), a microphone, a touch panel display, or the like.

The operation section 160 also includes an image sensor that is implemented by a color image sensor, a depth sensor, or the like. Note that the function of the operation section 160 may be implemented by only the image sensor.

A storage section 170 serves as a work area for a processing section 100, a communication section 196, and the like. The function of the storage section 170 may be implemented by a RAM (DRAM or VRAM) or the like. A game program and game data that is necessary when executing the game program are stored in the storage section 170.

An information storage medium 180 (computer-readable medium) stores a program, data, and the like. The function of the information storage medium 180 may be implemented by an optical disk (CD or DVD), a hard disk drive (HDD), a memory (e.g., ROM), or the like. The processing section 100 performs various processes according to this embodiment based on a program (data) stored in the information storage medium 180. Specifically, a program that causes a computer (i.e., a device including an operation section, a processing section, a storage section, and an output section) to function as each section according to this embodiment (i.e., a program that causes a computer to execute the process of each section) is stored in the information storage medium 180.

A display section 190 outputs an image generated according to this embodiment. The function of the display section 190 may be implemented by an LCD, an organic EL display, a CRT, a touch panel display, a head mount display (HMD), or the like. A sound output section 192 outputs sound generated according to this embodiment. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another is image generation system, a server, or a host device) via a cable or wireless network. The function of the communication section 196 may be implemented by hardware such as a communication ASIC or a communication processor or communication firmware.

A program (data) that causes a computer to function as each section according to this embodiment may be distributed to the information storage medium 180 (or the storage section 170 or the auxiliary storage device 194) from an information storage medium included in a server (host device) via a network and the communication section 196. Use of the information storage medium included in the server (host device) is also included within the scope of the invention.

The processing section 100 (processor) performs a game process, an image generation process, a sound generation process, and the like based on operation data from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or by a program:

The processing section 100 includes an image information acquisition section 102, an information acquisition section 104, a game calculation section 106, a grasp preparation motion determination section 107, a grasp motion determination section 108, a grasp-linked motion determination section 109, an attack calculation section 110, an object space setting section 112, a character control section 114, a virtual camera control section 118, an image generation section 120, and a sound generation section 130. The information acquisition section 104 includes a skeleton information acquisition section 105, and the character control section 114 includes a movement processing section 115 and a motion processing section 116. Note that various modifications may be made, such as omitting some of these elements or adding other elements.

The image information acquisition section 102 acquires image information from the image sensor. For example, information about an image captured by the image sensor is stored in an image information storage section 171 included in the storage section 170. Specifically, information about a color image captured by the color image sensor of the image sensor is stored in a color image information storage section 172, and information about a depth image captured by the depth sensor of the image sensor is stored in a depth information storage section 173. The image information acquisition section 102 reads (acquires) the image information from the image information storage section 171.

The information acquisition section 104 acquires skeleton information based on the image information acquired by the image information acquisition section 102. The information acquisition section 104 specifies the motion of the player based on the acquired skeleton information. The information acquisition section 104 sets an image processing area based on the skeleton information.

The game calculation section 106 performs a game calculation process. The game calculation process includes starting the game when game start conditions have been satisfied, proceeding with the game, calculating the game results, and finishing the game when game finish conditions have been satisfied, for example.

The grasp preparation motion determination section 107 determines a grasp preparation motion, the grasp motion determination section 108 determines a grasp motion, and the grasp-linked motion determination section 109 determines a grasp-linked motion. The attack calculation section 110 performs an attack calculation process on a character corresponding to the player. The details are described later.

The object space setting section 112 sets an object space where a plurality of objects are disposed. For example, the object space setting section 112 disposes an object (i.e., an object formed by a primitive surface such as a polygon, a free-form surface, or a subdivision surface) that represents a display object such as a character (e.g., human, animal, robot, car, ship, or airplane), a map (topography), a building, a course (road), a tree, or a wall in the object space. Specifically, the object space setting section 112 determines the position and the rotation angle (synonymous with orientation or direction) of the object in a world coordinate system, and disposes the object at the determined position (X, Y, Z) and the determined rotation angle (rotation angles around X, Y, and Z axes). More specifically, an object data storage section 175 of the storage section 170 stores an object number, and object data (e.g., the position, rotation angle, moving speed, and moving direction of the object (part object)) that is linked to the object number. The object space setting section 112 updates the object data every frame, for example.

The character control section 114 controls the character that moves (make a motion) in the object space. For example, the movement processing section 115 included in the character control section 114 moves the character (model object or moving object). The movement processing section 115 moves the character in the object space based on the operation information input by the player using the operation section 160, a program (movement algorithm), various types of data (motion data), and the like. More specifically, the movement processing section 115 performs a simulation process that sequentially calculates movement information (position, rotation angle, speed, or acceleration) about the character every frame (e.g., 1/60th of a second). The term "frame" refers to a time unit used when performing a movement process, a motion process, and an image generation process.

The motion processing section 116 included in the character control section 114 performs a motion process (motion reproduction or motion generation) that causes the character to make a motion (animation). The motion process may be implemented by reproducing the motion of the character based on motion data stored in a motion data storage section 176, for example.

Specifically, the motion data storage section 176 stores the motion data including the position or the rotation angle (i.e., the rotation angles of a child bone around three axes with respect to a parent bone) of each bone that forms the skeleton of the character (model object) (i.e., each part object that forms the character). A model data storage section 177 stores model data about the model object that indicates the character. The motion processing section 116 reproduces the motion of the character by reading the motion data from the motion data storage section 176, and moving each bone (part object) that forms the skeleton (i.e., changing the shape of the skeleton) based on the motion data.

The virtual camera control section 118 controls a virtual camera (viewpoint or reference virtual camera) for generating an image viewed from a given (arbitrary) viewpoint in the object space. Specifically, the virtual camera control section 118 controls the position (X, Y, Z) or the rotation angle (rotation angles around X, Y, and Z axes) of the virtual camera (i.e., controls the viewpoint position, the line-of-sight direction, or the angle of view).

For example, when photographing the character from behind using the virtual camera, the virtual camera control section 118 controls the position or the rotation angle (direction) of the virtual camera so that the virtual camera follows a change in the position or the rotation of the character. In this case, the virtual camera control section 118 may control the virtual camera based on information (e.g., position, rotation angle, or speed) about the character obtained by the movement processing section 115. Alternatively, the virtual camera control section 118 may rotate the virtual camera by a predetermined rotation angle, or may move the virtual camera along a predetermined path. In this case, the virtual camera control section 118 controls the virtual camera based on virtual camera data that specifies the position (moving path) or the rotation angle of the virtual camera.

The image generation section 120 performs a drawing process based on the results of various processes (game process and simulation process) performed by the processing section 100 to generate an image, and outputs the generated image to the display section 190. Specifically, the image generation section 120 performs a geometric process (e.g., coordinate transformation (world coordinate transformation and camera coordinate transformation), clipping, perspective transformation, or light source process), and generates drawing data (e.g., primitive surface vertex position coordinates, texture coordinates, color data, normal vector, or alpha-value) based on the results of the geometric process. The image generation section 120 draws the object (one or more primitive surfaces) subjected to perspective transformation in a drawing buffer 179 (i.e., a buffer (e.g., frame buffer or work buffer) that can store image information in pixel units) based on the drawing data (primitive surface data). The image generation section 120 thus generates an image viewed from the virtual camera (given viewpoint) in the object space. The drawing process may be implemented by a vertex shader process or a pixel shader process.

The image generation section 120 may generate a stereoscopic image. In this case, a left-eye virtual camera and a right-eye virtual camera are disposed using a reference virtual camera position and a reference inter-camera distance. The image generation section 120 generates a left-eye image viewed from the left-eye virtual camera in the object space, and generates a right-eye image viewed from the right-eye virtual camera in the object space. Stereoscopic vision may be implemented by a stereoscopic glass method or a naked-eye method using a lenticular lens or the like by utilizing the left-eye image and the right-eye image.

The sound generation section 130 performs a sound process based on the results of various processes performed by the processing section 100 to generate game sound (e.g., background music (BGM), effect sound, or voice), and outputs the generated game sound to the sound output section 192.

When the image information acquisition section 102 has acquired the image information from the image sensor, the grasp motion determination section 108 determines whether or not the player has made a grasp motion with the right hand or the left hand based on the acquired image information.

When the grasp motion determination section 108 has determined that the player has made a grasp motion, the grasp-linked motion determination section 109 determines whether or not the player has made a grasp-linked motion that follows the grasp motion with the other hand based on the image information from the image sensor. For example, when the grasp motion determination section 108 has determined that the player has made a grasp motion with the left hand (one hand), the grasp-linked motion determination section 109 determines whether or not the player has made a grasp-linked motion with the right hand (the other hand). When the grasp motion determination section 108 has determined that the player has made a grasp motion with the right hand (one hand), the grasp-linked motion determination section 109 determines whether or not the player has made a grasp-linked motion with the left hand (the other hand).

The image generation section 120 generates an image based on the determination results for the grasp motion and the grasp-linked motion. For example, the image generation section 120 generates an image in which a character corresponding to the player makes a grasp motion, and then makes a grasp-linked motion.

Note that the grasp-linked motion is made in connection (cooperation) with the grasp motion after the grasp motion. For example, the grasp-linked motion is expected to follow the grasp motion, and is linked to the grasp motion as a motion that is to be made in connection (cooperation) with the grasp motion. Examples of the grasp-linked motion include an attack motion (e.g., hit motion or throw motion and), a stroke motion, a hit motion, a check motion, a hold motion, a motion that further grasps something with the other hand (i.e., a motion that grasps something with both hands), and the like.

The term "hand" used herein includes both the end part of a person's arm beyond the wrist and the entire arm.

The grasp-linked motion determination section 109 determines a grasp-linked motion among first to Mth grasp-linked motions (M is an integer equal to or larger than 2) that has been made by the player with the other hand based on the image information from the image sensor. Examples of the first to Mth grasp-linked motions include an attack motion, a stroke motion, a hit motion, a check motion, a hold motion, a motion that further grasps something with the other hand, and the like. For example, when the grasp motion determination section 108 has determined that the player has made a grasp motion with one hand (e.g., left hand), the grasp-linked motion determination section 109 determines a grasp-linked motion among the first to Mth grasp-linked motions (e.g., attack motion, stroke motion, and hit motion) that has been made by the player with the other hand (e.g., right hand). Specifically, the grasp-linked motion determination section 109 determines the grasp-linked motion based on the image information from the image sensor. When the grasp-linked motion determination section 109 has determined that the player has made the Kth grasp-linked motion ($1 \leq K \leq M$) among the first to Mth grasp-linked motions, the image generation section 120 generates an image in which the character corresponding to the player makes a grasp motion with one hand, and then makes the Kth grasp-linked motion with the other hand.

In this case, the grasp-linked motion determination section 109 determines a grasp-linked motion among the first to Mth grasp-linked motions that has been made by the player with the other hand based on information about the image area corresponding to the other hand. Specifically, the grasp-linked motion determination section 109 determines a grasp-linked motion among the first to Mth grasp-linked motions that has been made by the player with the other hand based on the size (area) of the image area. For example, when the grasp-linked motion determination section 109 has determined that the player has made a grasp-linked motion with the right hand, the grasp-linked motion determination section 109 calculates the size of the image area of the right hand, and determines a grasp-linked motion among the first to Mth grasp-linked motions that has been made by the player with the right hand. When the grasp-linked motion determination section 109 has determined that the player has made a grasp-linked motion with the left hand, the grasp-linked motion determination section 109 calculates the size of the image area of the left hand, and determines a grasp-linked motion among the first to Mth grasp-linked motions that has been made by the player with the left hand.

When the image information acquisition section 102 has acquired color image information as the image information, the grasp-linked motion determination section 109 determines a grasp-linked motion among the first to Mth grasp-linked motions that has been made by the player with the other hand based the size of the image area corresponding to the other hand in the color image information. For example, the grasp-linked motion determination section 109 calculates the size of the image area in the color of the other hand (e.g., skin color) to determine a grasp-linked motion among the first to Mth grasp-linked motions that has been made by the player with the other hand. The color image information is image information in which a color value is set to each pixel position, for example. When the image information acquisition section 102 has acquired depth information as the image information, the grasp-linked motion determination section 109 may determine a grasp-linked motion among the first to Mth grasp-linked motions that has been made by the player with the other hand based the size of the image area corresponding to the other hand in the depth information. For example, the grasp-linked motion determination section 109 calculates the size of the image area corresponding to the depth value of the other hand to determine a grasp-linked motion among the first to Mth grasp-linked motions that has been made by the player with the other hand. The depth information is image information in which a depth value is set to each pixel position.

The grasp-linked motion determination section 109 may change a determination threshold value used when determining the size of the image area based on information about the distance between the display section 190 that displays the generated image and the player. For example, the grasp-linked motion determination section 109 increases the determination threshold value used when determining the size of the image area when it has been determined that the distance between the display section 190 and the player is short. The grasp-linked motion determination section 109 decreases the determination threshold value used when determining the size of the image area when it has been determined that the distance between the display section 190 and the player is long. The determination threshold value can thus be set to an appropriate value based on the distance between the display section 190 and the player. Note that the information about the distance between the display section 190 and the player may be the distance between the display section 190 and the player, or may be information equivalent to the distance between the display section 190 and the player. For example, the grasp-linked motion determination section 109 may change the determination threshold value using the depth value at the representative position of the player or the position of the hand of the player as the distance between the display section 190 and the player.

Note that the information about the image area used when determining whether or not the player has made a grasp-linked motion is not limited to the size of the image area. Whether or not the player has made a grasp-linked motion may be determined based on arbitrary information about the image area. For example, whether or not the player has made a grasp-linked motion may be determined based on the color image information or the depth information about the image area.

It is desirable to determine whether or not the player has made a grasp-linked motion based on the information about the image area within a given period. For example, whether or not the player has made a grasp-linked motion is determined using the information about the image area corresponding to a plurality of frames after it has been determined that the player has made a grasp motion. Specifically, the information about the image area that has been maintained for a given period is used for the determination process without using the information (e.g., area) about the image area that has momentarily changed. This prevents a situation in which the player is erroneously determined to have made a grasp-linked motion when the information about the image area has momentarily changed due to noise or the like.

It is desirable to determine whether or not the player has made a grasp motion based on the information about the image area at a given timing. For example, a timing at which a grasp-linked motion should be performed is presented to the player using an image, sound, or the like, and whether or not the player has made a grasp-linked motion is determined based on the information about the image area at the instruction timing (given timing). When it has been determined that the player has made a grasp-linked motion at the instruction timing based on the information about the image area at the instruction timing, points or the like are given to the player. This makes it possible to provide a novel music game, action game, sport game, and the like.

The grasp-linked motion determination section 109 may determine a grasp-linked motion among the first to Mth grasp-linked motions that has been made by the player with the other hand based on image information about a recognition member that is fitted to the hand of the player. For example, the player wears gloves (described later) or the like as the recognition member. The grasp-linked motion determination section 109 determines a grasp-linked motion that has been made by the player based on the color image information or the like about the recognition member (e.g., gloves).

The grasp-linked motion determination section 109 may determine a grasp-linked motion among the first to Mth grasp-linked motions that has been made by the player with the other hand by a shape recognition process on the image information about the other hand. For example, when the grasp-linked motion determination section 109 has determined that the other hand is flat, the grasp-linked motion determination section 109 determines that the player has made an attack motion with the palm of the other hand. When the grasp-linked motion determination section 109 has determined that the player has clenched the other hand, the grasp-linked motion determination section 109 determines that the player has made a punch motion with the other hand. The shape recognition process may be implemented by providing a template image that indicates the shape of a hand in a flat state or a clenched state, and performing a matching process with the template image, for example.

Whether or not the player has made a grasp-linked motion may be determined based on motion vector information or speed information included in the image information about the other hand. For example, the grasp-linked motion determination section 109 detects the motion vector or the speed of the other hand, and determines a grasp-linked motion among first to Mth grasp-linked motions that has been made by the player with the other hand based on the detected motion vector or speed.

The information acquisition section 104 acquires skeleton information that specifies the motion of the player viewed from the image sensor based on the image information from the image sensor. The acquired skeleton information is stored in a skeleton information storage section 174.

The skeleton information specifies the motion of the player viewed from the image sensor, for example. Specifically, the skeleton information includes a plurality of pieces of joint position information corresponding to a plurality of joints of the player, each of the plurality of pieces of joint position information including three-dimensional coordinate information. Each joint connects bones, and a skeleton is formed by connecting a plurality of bones.

The grasp-linked motion determination section 109 determines whether or not the player has made a grasp-linked motion with the other hand based on the skeleton information about the player. The grasp-linked motion determination section 109 determines a grasp-linked motion among the first to Mth grasp-linked motions that has been made by the player with the other hand based on the skeleton information. Specifically, the grasp-linked motion determination section 109 determines a grasp-linked motion among the first to Mth grasp-linked motions that has been made by the player with the other hand based on the joint position information included in the skeleton information. For example, first reference skeleton information to Mth reference skeleton information are provided as templates that indicate the skeleton information about the first to Mth grasp-linked motions. A matching process is performed on the skeleton information about the player detected based on the image information and the first reference skeleton information to the Mth reference skeleton information. A grasp-linked motion among the first to Mth grasp-linked motions that has been made by the player is determined using the result for the evaluation function of the matching process. In this case, the matching process may be performed across (over) a plurality of frames, for example.

The information acquisition section 104 sets an image processing area for determining whether or not the player has made the grasp motion or the grasp-linked motion based on the acquired skeleton information. For example, when it has been determined that the player has made a grasp preparation motion described later with the left hand, the information acquisition section 104 specifies the position of the left hand based on the skeleton information, and sets an area having a given size (i.e., an area that is smaller than the screen) and including the specified position as the processing area. The grasp motion determination section 108 processes the image information (color image information and depth information) about the processing area to determine whether or not the player has made a grasp motion with the left hand. When it has been determined that the player has made a grasp preparation motion with the right hand, the information acquisition section 104 specifies the position of the right hand based on the skeleton information, and sets an area having a given size and including the specified position as the processing area. The grasp motion determination section 108 processes the image information about the processing area to determine whether or not the player has made a grasp motion with the right hand.

When it has been determined that the player has made a grasp motion with one hand, the information acquisition section 104 specifies the position of the other hand based on the skeleton information, and sets an area having a given size and including the specified position as the processing area. The grasp-linked motion determination section 109 processes the image information about the processing area to determine whether or not the player has made a grasp-linked motion with the other hand.

The character control section 114 controls a character corresponding to the player. The character is displayed on the display section 190 when using a third-person viewpoint, but is not displayed on the display section 190 (i.e., virtual object) when using a first-person viewpoint.

The image generation section 120 generates an image that indicates a state in which the character makes a grasp motion and a grasp-linked motion when it has been determined that the player has made a grasp motion and a grasp-linked motion. For example, the image generation section 120 generates an image that indicates a state in which the character makes a grasp motion, and then makes a grasp-linked motion. In this case, the motion of the character may be implemented by motion reproduction using the skeleton information about the player acquired from the image information from the image sensor.

The grasp-linked motion determination section 109 determines whether or not the player has made an attack motion with the other hand as the grasp-linked motion based on the image information from the image sensor. In this case, the attack calculation section 110 sets an attack calculation parameter (e.g., attack capability parameter or stiff time parameter) of the attack motion with the other hand based on the image information from the image sensor. The attack calculation section 110 performs an attack calculation process based on the attack calculation parameter. For example, the attack calculation section 110 acquires the motion vector information and the speed information about the other hand based on the image information or the skeleton information, and sets the attack calculation parameter of the attack motion with the other hand based on the motion vector information and the speed information.

The grasp preparation motion determination section 107 determines whether or not the player has made a grasp preparation motion based on the image information from the image sensor. The term "grasp preparation motion" refers to a series of motions made by the player before the player makes a grasp motion. Specifically, the term "grasp preparation motion" refers to a preparation motion (e.g., stretches or bends the arm, or bends the wrist) made by the player before grasping the opposing character, an item, or the like.

When the grasp preparation motion determination section 107 has determined that the player has made a grasp preparation motion, the grasp motion determination section 108 processes an image corresponding to the hand of the player that has made a grasp preparation motion. The grasp motion determination section 108 determines whether or not the player has made a grasp motion that follows the grasp preparation motion based on the image processing result.

For example, when the grasp preparation motion determination section 107 has determined that the player has made a grasp preparation motion with the left hand (left arm) (e.g., has stretched or bent the left arm), the grasp motion determination section 108 processes an image corresponding to the left hand of the player (e.g., an image of an image area that includes the left hand). For example, when the grasp preparation motion determination section 107 has determined that the player has made a grasp preparation motion with the right hand (right arm) (e.g., has stretched or bent the right arm), the grasp motion determination section 108 processes an image corresponding to the right hand of the player (e.g., an image of an image area that includes the right hand). The grasp motion determination section 108 determines whether or not the player has made a grasp motion with the right hand or the right hand based on the image processing result. The image generation section 120 generates an image based on the is grasp motion determination result. For example, the image generation section 120 generates an image in which the character (hand of the character) corresponding to the player makes a grasp motion when the grasp motion determination section 108 has determined that the player has made a grasp motion The grasp motion determination section 108 determines whether or not the player has made a grasp motion based on information about an image area corresponding to the hand of the player that has been determined to have made a grasp preparation motion. Specifically, the grasp motion determination section 108 determines whether or not the player has made a grasp motion based on the size of the image area. For example, when it has been determined that the player has made a grasp preparation motion with the left hand, the grasp motion determination section 108 calculates the size of the image area of the left hand to determine whether or not the player has made a grasp motion with the left hand. When it has been determined that the player has made a grasp preparation motion with the right hand, the grasp motion determination section 108 calculates the size of the image area of the right hand to determine whether or not the player has made a grasp motion with the right hand.

When the image information acquisition section 102 has acquired color image information as the image information, the grasp motion determination section 108 determines whether or not the player has made a grasp motion based the size of the image area in the color image information. For example, the grasp motion determination section 108 calculates the size of the image area in the color of the other hand (e.g., skin color) to determine whether or not the player has made a grasp motion. When the image information acquisition section 102 has acquired depth information as the image information, the grasp motion determination section 108 may determine whether or not the player has made a grasp motion based the size of the image area in the depth information. For example, the grasp motion determination section 108 calculates the size of the image area corresponding to the depth value of the hand to determine whether or not the player has made a grasp motion.

The grasp motion determination section 108 may change a determination threshold value used when determining the size of the image area based on information about the distance between the display section 190 that displays the generated image and the player.

Note that the information about the image area used when determining whether or not the player has made a grasp motion is not limited to the size of the image area. Whether or not the player has made a grasp motion may be determined based on arbitrary information about the image area. For example, whether or not the player has made a grasp motion may be determined based on the color image information or the depth information about the image area.

It is desirable to determine whether or not the player has made a grasp motion based on the information about the image area within a given period. For example, whether or not the player has made a grasp motion is determined using the information about the image area corresponding to a plurality of frames after it has been determined that the player has made a grasp preparation motion. This prevents a situation in which the player is erroneously determined to have made a grasp motion due to noise or the like.

It is desirable to determine whether or not the player has made a grasp motion based on the information about the image area at a given timing. For example, a timing at which a grasp motion should be performed is presented to the player using an image, sound, or the like, and whether or not the player has made a grasp motion is determined based on the information about the image area at the instruction timing (given timing). When it has been determined that the player has made a grasp motion at the instruction timing based on the information about the image area at the instruction timing, points or the like are given to the player. This makes it possible to provide a novel game.

The grasp motion determination section 108 may determine whether or not the player has made a grasp motion based on image information about a recognition member that is fitted to the hand of the player.

The grasp motion determination section 108 may determine whether or not the player has made a grasp motion by a shape recognition process on the image information about the hand of the player that has been determined to have made a grasp preparation motion.

The grasp preparation motion determination section 107 may determine whether or not the player has made a grasp preparation motion based on the skeleton information about the player. For example, reference skeleton information is provided as a template that indicates the skeleton information about the grasp preparation motion. A matching process is performed on the skeleton information about the player detected based on the image information and the reference skeleton information, and whether or not the player has made a grasp preparation motion is determined based on the result for the evaluation function of the matching process.

2. Method

The method according to this embodiment is described in detail below.

2.1 Determination of Grasp Motion and Grasp-Linked Motion

A game device is normally configured so that the player performs a game operation by operating a button or a lever of a game controller. A game device may be configured so that a game controller includes a motion sensor (six-axis sensor), and the player performs a game operation by moving the game controller.

However, a game device that utilizes such an operation interface requires a game controller for performing a game operation, and cannot implement a game operation that directly reflects a gesture (e.g., hand (arm) movement) made by the player, so that the player cannot be fully involved in virtual reality.

In order to deal with this problem, this embodiment employs an operation interface that detects an operation input performed by the player based on image information captured by an image sensor.

Figure 2A:
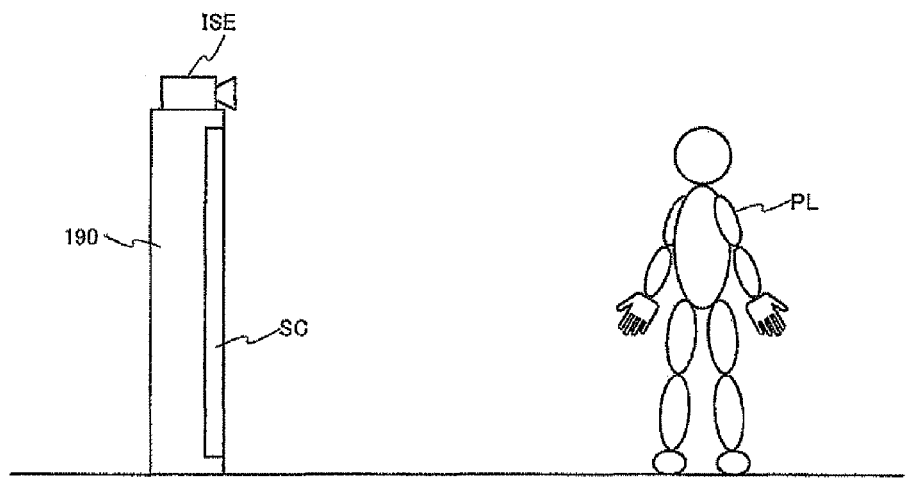
FIGS. 2A and 2B are views illustrative of a method that acquires color image information and depth information using an image sensor.

In FIG. 2A, an image sensor ISE that is implemented by a depth sensor (e.g., infrared sensor) and a color image sensor (RGB sensor (e.g., CCD or CMOS sensor)) is installed at a position corresponding to the display section 190. The image sensor ISE is installed so that its imaging direction (optical axis direction) coincides with the direction from the display section 190 to a player PL, for example. The image sensor ISE acquires (captures) color image information and depth information about the player PL viewed from the display section 190. The image sensor ISE may be provided in the display section 190, or may be provided as an external element (component).

Figure 2B:
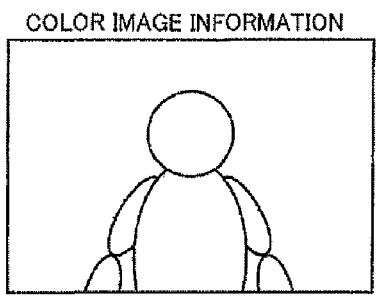
Figure 2B:
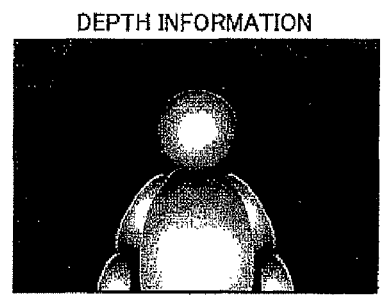

Color image information and depth information shown in FIG. 2B are acquired using the image sensor ISE shown in 2A. For example, the color image information includes color information about the player PL and his surroundings. The depth information includes depth values of the player PL and his surroundings as grayscale values, for example. The color image information may be image information in which a color value (RGB) is set to each pixel position, and the depth information may be image information in which a depth value is set to each pixel position, for example. Note that the image sensor ISE may be a sensor in which the depth sensor and the color image sensor are separately provided, or may be a sensor in which the depth sensor and the color image sensor are integrated.

The depth information may be acquired by a known method. For example, the depth information is acquired by emitting light (e.g., infrared radiation) from the image sensor ISE (depth sensor), and detecting the reflection intensity or the time of flight of the emitted light to detect the shape of the object (e.g., player PL) viewed from the position of the image sensor ISE. The depth information is indicated by grayscale data (e.g., an object positioned near the image sensor ISE is bright, and an object positioned away from the image sensor ISE is dark). Note that the depth information may be acquired in various ways. For example, the depth information (i.e., information about the distance from the object) may be acquired simultaneously with the color image information using a CMOS sensor or the like. The depth information may also be acquired using a distance sensor (ranging sensor) or the like that utilizes ultrasonic waves, for example.

In this embodiment, when it has been determined that the player PL has made a grasp preparation motion based on the image information from the image sensor ISE, an image corresponding to the hand that makes the grasp preparation motion is processed, and whether or not the player PL has made a grasp motion that follows the grasp preparation motion is determined.

Figure 3A:
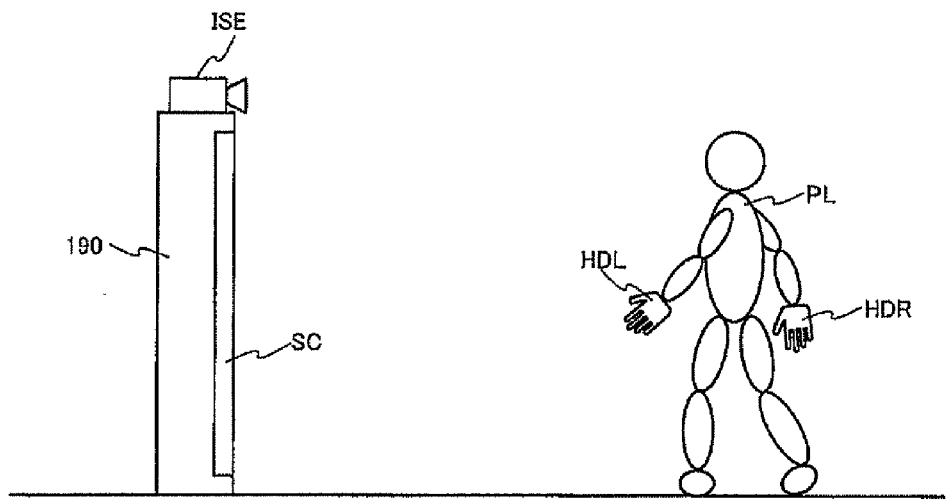
FIGS. 3A and 3B are views illustrative of a method that determines whether or not the player has made a grasp preparation motion.
Figure 3B:
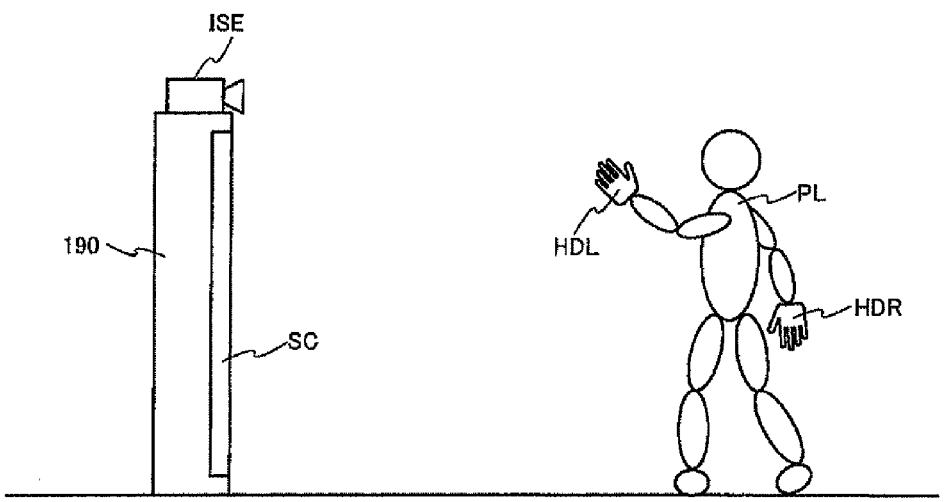

In FIGS. 3A and 3B, the player PL makes a grasp preparation motion (i.e., gradually raises the left hand HDL). In this case, the image sensor ISE acquires image information (e.g., color image information and depth information) as shown in FIG. 2B. Whether or not the player PL has made a grasp preparation motion is determined based on the acquired image information.

For example, the motion of the player PL is detected based on the color image information and the depth information shown in FIG. 2B to determine whether or not the player PL has made a grasp preparation motion. Specifically, skeleton information about the player PL is detected based on the depth information shown in FIG. 2B, and the joint movement indicated by the skeleton information is analyzed to determine whether or not the player PL has made a grasp preparation motion. For example, first reference skeleton information to Nth reference skeleton information (templates) are provided, the first reference skeleton information to the Nth reference skeleton information respectively corresponding to first to Nth grasp preparation motions that are considered to be made by the player PL. A matching process is then performed on the skeleton information about the player PL detected based on the depth information and the first reference skeleton information to the Nth reference skeleton information. For example, when an evaluation function of matching between the Lth reference skeleton information ($1 \leq L \leq N$) among the first reference skeleton information to the Nth reference skeleton information and the skeleton information about the player PL is equal to or less than a given value, the Lth reference skeleton information is determined to coincide with the skeleton information about the player PL. It is thus determined that the player PL has made the Lth grasp preparation motion corresponding to the Lth reference skeleton information.

Note that whether or not the player PL has made a grasp preparation motion may be determined based on the image information using a known motion determination method other than the method using the skeleton information. For example, the matching process may be performed using the color image information or the depth information to determine whether or not the player PL has made a grasp preparation motion. Alternatively, only a change in information about the joint (e.g., wrist and elbow) indicated by the skeleton information may be monitored to determine whether or not the player PL has made a grasp preparation motion.

When it has been determined that the player PL has made a grasp preparation motion shown in FIGS. 3A and 3B, the image is processed in an area around the hand that has made a grasp preparation motion. For example, the color image information and the depth information are processed (subjected to image processing) in an area around the hand, and whether or not the player PL has made a grasp motion that follows the grasp preparation motion is determined based on the image processing result.

Figure 4A:
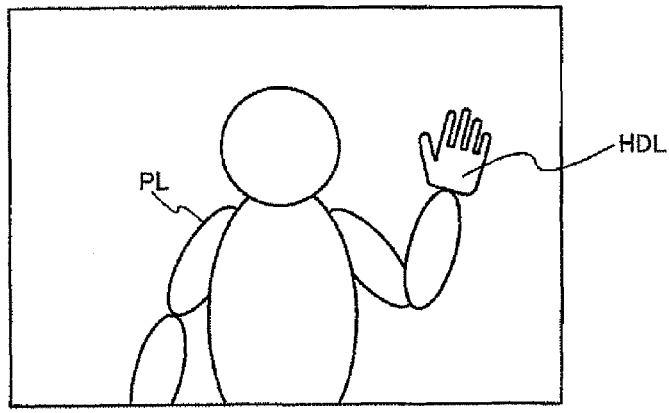
FIGS. 4A and 4B are views illustrative of a method that determines whether or not the player has made a grasp motion.
Figure 4B:
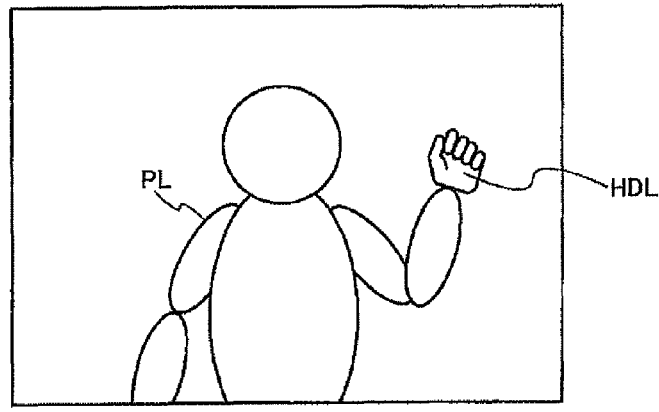

FIGS. 4A and 4B show examples of color image information (depth information) acquired (captured) by the image sensor ISE. In FIG. 4A, the left hand HDL of the player PL is flat. In FIG. 4B, the player PL has clenched the left hand HDL. In this case, it is determined that the player PL has made a grasp motion that follows the grasp preparation motion.

Figure 5:
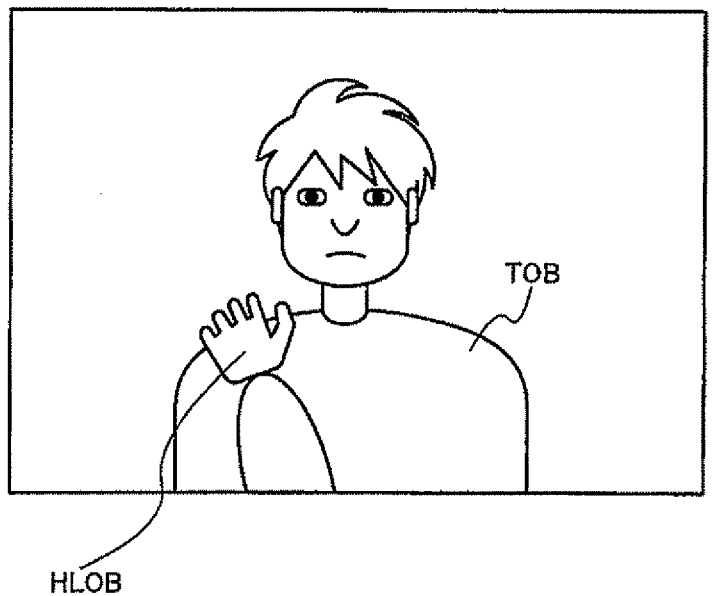
FIG. 5 shows an example of an image generated according to one embodiment of the invention.

When it has been determined that the player PL has made a grasp motion, an image as shown in FIG. 5 is generated, and displayed on the display section 190. In FIG. 5, the shoulder of the opposing character (target object TOB) is grasped with a hand HLOB (hand object) of a character corresponding to the player PL. Specifically, the character corresponding to the player PL makes a motion in the object space (game space) based on the operation performed by the player PL. The operation performed by the player PL is detected by detecting the motion of the player PL using the image sensor ISE, for example. When the player PL has made a grasp preparation motion (see FIGS. 3A and 3B), and made a grasp motion (see FIGS. 4A and 4B), an image as shown in FIG. 5 is generated.

Note that FIG. 5 shows an example of a first-person viewpoint image. A third-person viewpoint image may also be generated. While the whole body (or at least the head) of the character is displayed in the third-person viewpoint image, the whole body (head) of the character is not displayed in the first-person viewpoint image (i.e., only part (e.g., hand (arm)) of the character is displayed in the first-person viewpoint image (see FIG. 5)).

In this embodiment, when it has been determined that the player has made a grasp motion with one hand by the method described with reference to FIGS. 4A and 4B, whether or not the player has made a grasp-linked motion that follows the grasp motion with the other hand is determined based on the image information from the image sensor ISE.

Figure 6A:
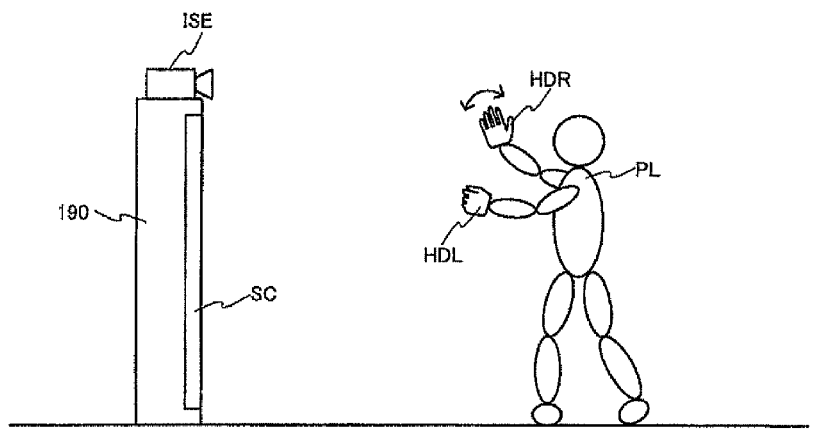
FIGS. 6A and 6B are views illustrative of a method that determines whether or not the player has made a grasp-linked motion.
Figure 6B:
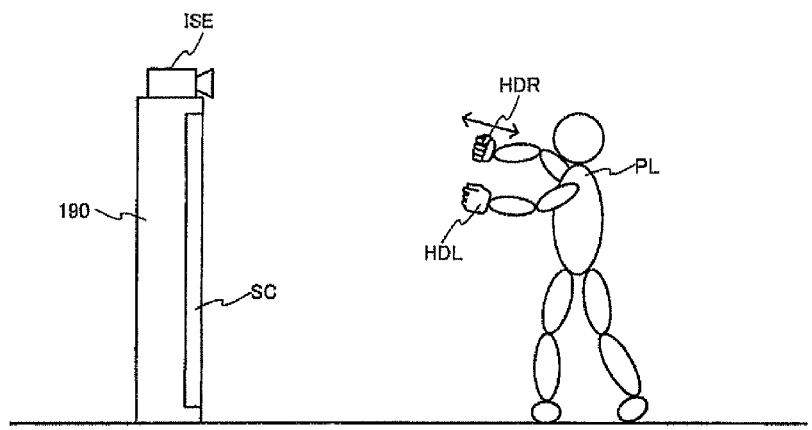

In FIGS. 6A and 6B, the player PL makes a grasp-linked motion with a right hand HDR (the other hand) after making the grasp motion shown in FIGS. 4A and 4B with the left hand HDL (one hand). In FIG. 6A, the player PL attacks the opposing character with the palm of the right hand HDR (i.e., grasp-linked motion) after grasping the opposing character with the left hand HDL. In FIG. 6B, the player PL punches the opposing character with the right hand HDR (i.e., grasp-linked motion) after grasping the opposing character with the left hand HDL.

In this case, the image sensor ISE acquires the image information (e.g., color image information and depth information) as shown in FIG. 2B. Whether or not the player PL has made a grasp-linked motion after the grasp motion is determined based on the acquired image information.

For example, the motion of the player PL is detected based on the color image information and the depth information shown in FIG. 2B to determine whether or not the player PL has made a grasp-linked motion. Specifically, skeleton information about the player PL is detected based on the depth information shown in FIG. 2B, and the joint movement indicated by the skeleton information is analyzed to determine whether or not the player PL has made a grasp-linked motion. For example, first reference skeleton information to Mth reference skeleton information (templates) are provided, the first reference skeleton information to the Mth reference skeleton information respectively corresponding to first to Mth grasp-linked motions that are considered to be made by the player PL. A matching process is then performed on the skeleton information about the player PL detected based on the depth information and the first reference skeleton information to the Mth reference skeleton information. For example, when an evaluation function of matching between the Kth reference skeleton information ($1 \leq K \leq M$) among the first reference skeleton information to the Mth reference skeleton information and the skeleton information about the player PL is equal to or less than a given value, the Kth reference skeleton information is determined to coincide with the skeleton information about the player PL. It is thus determined that the player PL has made the Kth grasp-linked motion corresponding to the Kth reference skeleton information.

This makes it possible to determine a grasp-linked motion among the first to Mth grasp-linked motions that has been made by the player PL with the other hand based on the image information from the image sensor ISE.

Note that whether or not the player PL has made a grasp-linked motion may be determined based on the image information using a known motion determination method other than the method using the skeleton information. For example, the matching process may be performed using the color image information or the depth information to determine whether or not the player PL has made a grasp-linked motion. Alternatively, only a change in information about the joint (e.g., wrist and elbow) indicated by the skeleton information may be monitored to determine whether or not the player PL has made a grasp-linked motion.

Alternatively, an image area corresponding to the other hand with which the grasp-linked motion has been made may be processed (subjected to image processing) to determine whether or not the player PL has made a grasp-linked motion with the other hand, or determine a grasp-linked motion among the first to Mth grasp-linked motions that has been made by the player PL.

Figure 7A:
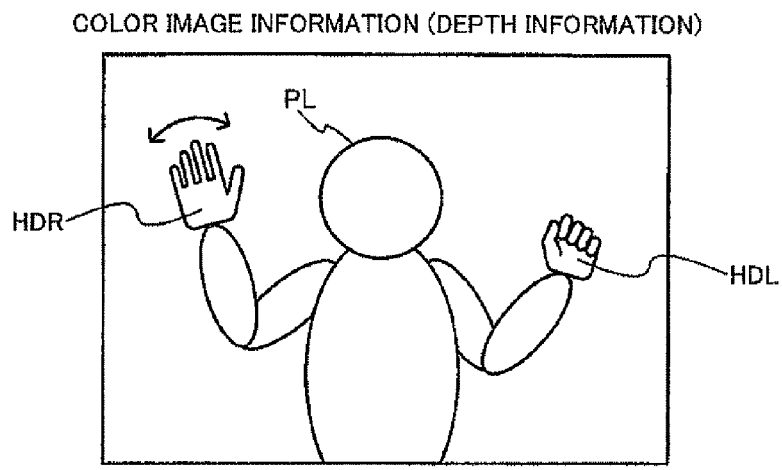
FIGS. 7A and 7B are views illustrative of a method that determines whether or not the player has made a grasp-linked motion.
Figure 7B:
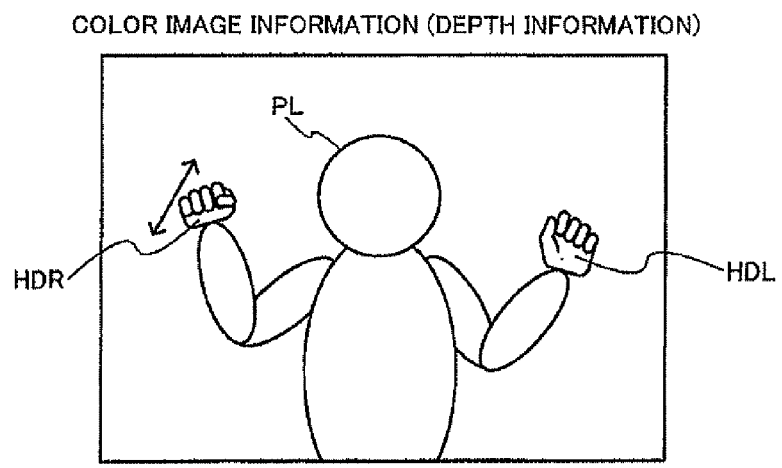

FIGS. 7A and 7B show examples of the color image information (depth information) acquired (captured) by the image sensor ISE.

In FIG. 7A, the player PL has made a grasp motion (e.g., grasped the opposing character) with the left hand HDL (one hand). In this case, an image area corresponding to the right hand HDR (the other hand) is processed (subjected to image processing). In FIG. 7A, it is detected by image processing that the right hand HDR (the other hand) of the player PL is flat. When the player PL has made a grasp motion (e.g., grasped the opposing character) with the left hand HDL (one hand), and it has been detected by image processing that the right hand HDR (the other hand) of the player PL is flat, it is determined that the player PL has made a grasp-linked motion that attacks the opposing character with the palm of the right hand HDR (see FIG. 6A).

In FIG. 7B, the player PL has made a grasp motion (e.g., grasped the opposing character) with the left hand HDL (one hand). Therefore, an image area corresponding to the right hand HDR (the other hand) is processed (subjected to image processing). In FIG. 7B, it is detected by image processing that the player PL has clenched the right hand HDR (the other hand). When the player PL has made a grasp motion with the left hand HDL (one hand), and it has been detected by image processing that the player PL has clenched the right hand HDR (the other hand), it is determined that the player PL has made a grasp-linked motion that punches the opposing character with the right hand HDR (see FIG. 6B).

According to the method described with reference to FIGS. 7A and 7B, it is possible to determine whether or not the player PL has made a grasp-linked motion with the other hand, or determine a grasp-linked motion among the first to Mth grasp-linked motions that has been made by the player PL. Specifically, it is possible to determine a grasp-linked motion among a plurality of grasp-linked motions (first to Mth grasp-linked motions) (e.g., a hit with the palm, or punch) that has been made by the player PL with the other hand.

Figure 8A:
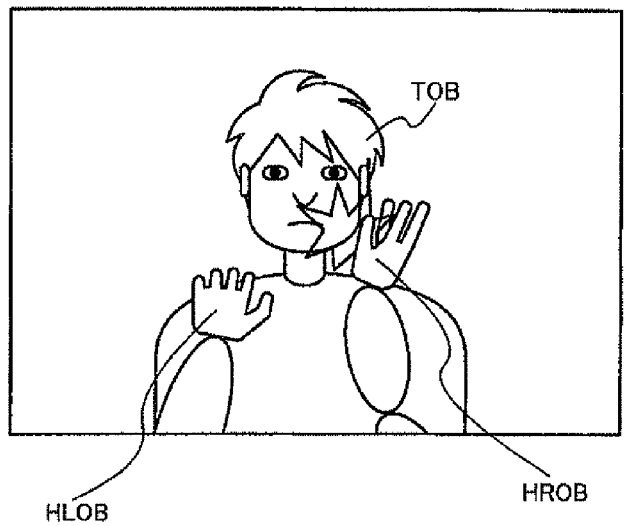
FIGS. 8A and 8B show examples of an image generated according to one embodiment of the invention.
Figure 8B:
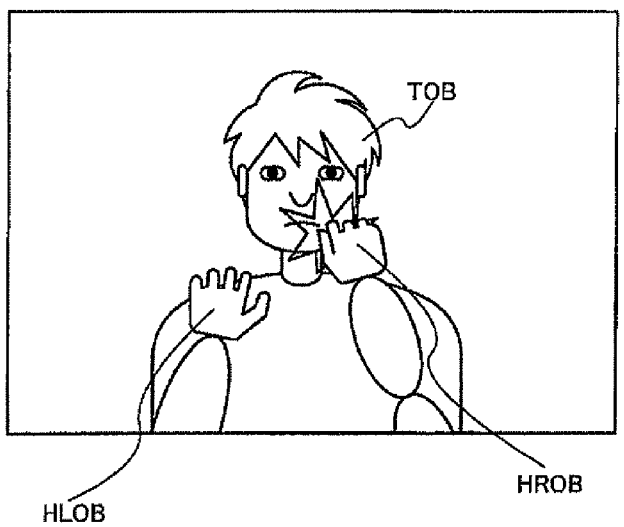

When it has been determined that the player PL has made a grasp-linked motion, an image as shown in FIG. 8A or 8B is generated, and displayed on the display section 190. In FIG. 8A, the shoulder of the opposing character is grasped with the left hand HLOB of the character corresponding to the player PL, and the opposing character is hit with the palm of a right hand HROB. In FIG. 8B, the shoulder of the opposing character is grasped with the left hand HLOB of the character, and the opposing character is punched with the right hand HROB.

The method according to this embodiment thus makes it possible to determine a grasp motion and the subsequent grasp-linked motion of the player based on the image information from the image sensor. This makes it possible to detect a grasp motion or a grasp-linked motion of the player that cannot be easily detected based on a game operation performed using a game controller, and determine whether or not the player has made a grasp motion or a grasp-linked motion. This makes it possible to implement a game that advances when a character corresponding to the player has moved in the game space (object space), and grasped the opposing character, an item, or the like. When the player has made a grasp motion, the character corresponding to the player also makes a grasp motion. Therefore, the motion (movement) of the player is intuitively reflected in the game image, so that an unprecedented game image can be generated. Since the motion (movement) of the player is directly reflected in the game image, the player is fully involved in virtual reality.

Various games that have been difficult to implement can be provided by determining a grasp-linked motion that follows the grasp motion. For example, the player can cause the character to grasp the opposing character in the game space with one hand, and attack the opposing character with the palm of the other hand, punch the opposing character with the other hand, or throw the opposing character down with the other hand. Alternatively, the player can cause the character to grasp an item disposed in the game space with one hand, and hit, stroke, or investigate the item with the other hand. According to this embodiment, the details of the grasp-linked motion made with the other hand can be determined. Specifically, it is possible to determine whether the grasp-linked motion made with the other hand is a hit motion with the palm, a punch motion, a throw-down motion, a hit motion, a stroke motion, or a check motion, for example. Therefore, the subsequent game process or the game development can be changed based on the determination result, so that a novel game can be implemented.

In this embodiment, when it has been determined that the player has made a grasp motion with one hand, whether or not the player has made a grasp-linked motion with the other hand is determined based on the skeleton information about the other hand and image processing on the other hand. This makes it possible to appropriately and reliably detect the grasp-linked motion of the player.

Specifically, if only the motion of the right hand HDR shown in FIGS. 7A and 7B is detected based on image processing or the skeleton information to determine whether or not the player has made a grasp-linked motion, a motion other than the grasp-linked motion may be erroneously determined to be the grasp-linked motion. Moreover, since it is necessary to perform grasp-linked motion detection image processing or the like over the entire image (screen), the processing load increases. In particular, the processing load increases to a large extent if the grasp-linked motion detection process based on grasp-linked motion detection image processing or the skeleton information is performed in each frame.

In this embodiment, the grasp-linked motion detection process based on grasp-linked motion detection image processing or the skeleton information (see FIGS. 7A and 7B) is performed on condition that the player has made a grasp motion as shown in FIGS. 4A and 4B. This males it unnecessary to perform the grasp-linked motion detection process based on grasp-linked motion detection image processing or the skeleton information every each frame, so that the processing load can be reduced. Moreover, the target range of grasp-linked motion detection image processing or the like can be limited by determining whether or not the player has made a grasp motion before determining whether or not the player has made a grasp-linked motion. For example, when it has been determined that the player has made a grasp motion with the left hand (one hand), it suffices to perform grasp-linked motion detection image processing or the like on only the right hand (the other hand). Therefore, the processing load can be reduced.

In this embodiment, when it has been determined that the player has made a grasp preparation motion, whether or not the player has made a grasp motion is determined by image processing on an image of the hand of the player that has made the grasp preparation motion. This makes it possible to appropriately and reliably detect the grasp motion of the player.

Specifically, if it is determined that the player has made a grasp motion when having detected that the player has clenched the hand (see FIGS. 4A and 4B), a motion other than the grasp motion may be erroneously determined to be the grasp motion. Moreover, since it is necessary to perform grasp motion detection image processing for detecting whether or not the player has clenched the hand over the entire image (screen), the processing load increases.

In this embodiment, grasp motion detection image processing (see FIGS. 4A and 4B) is performed on condition that the player has made a grasp preparation motion as shown in FIGS. 3A and 3B. This males it unnecessary to perform grasp motion detection image processing every each frame, so that the processing load can be reduced. Moreover, since the target range of grasp motion detection image processing can be limited, the processing load can be further reduced.

2.2 Determination Process Based on Size of Image Area

An example of a specific method that determines whether or not the player has performed a grasp motion (see FIGS. 4A and 48) or a grasp-linked motion (see FIGS. 7A and 7B) is described below. In this embodiment, whether or not the player has made a grasp motion is determined based on the size of the image area of the hand of the player that has been determined to have made a grasp preparation motion, for example. When it has been determined that the player has made a grasp motion with one hand, whether or not the player has made a grasp-linked motion is determined based on the size of the image area corresponding to the other hand. A method that determines whether or not the player has made a grasp motion based on the size of the image area is mainly described below. Note that the following determination method may similarly be applied when determining whether or not the player has made a grasp-linked motion.

Figure 9A:
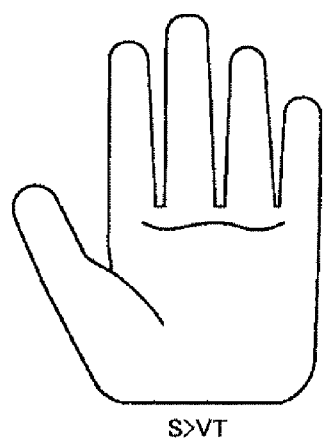
FIGS. 9A to 9C are views illustrative of a method that determines whether or not the player has made a grasp motion or a grasp-linked motion based on the size of an image area of a hand.
Figure 9B:
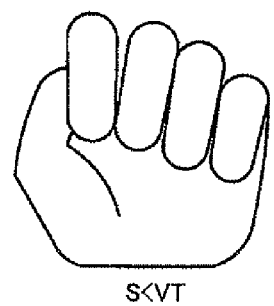

FIG. 9A shows a state in which the hand of the player is flat, and FIG. 9B shows a state in which the player has clenched the hand. As shown in FIGS. 9A and 9B, the size S of the image area of the hand of the player is smaller when the player has clenched the hand (FIG. 9B) than the case where the hand of the player is flat (FIG. 9A). Therefore, it is determined that the hand of the player is flat when the size S of the image area of the hand is larger than a determination threshold value VT, and it is determined that the player has clenched the hand when the size S of the image area of the hand is smaller than the determination threshold value VT.

Figure 9C:
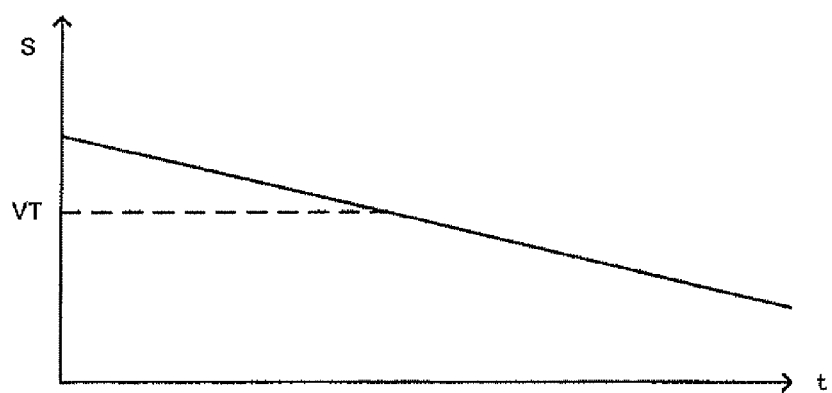

As shown in FIG. 9C, it is determined that the player has made a grasp motion when it has been determined that the player has made a grasp preparation motion, and the size S of the image area of the corresponding hand has decreased to a value smaller than the determination threshold value VT. It is determined that the player has not made a grasp motion when it has been determined that the player has made a grasp preparation motion, and the size S of the image area of the corresponding hand has not decreased to a value smaller than the determination threshold value VT even when a given time has elapsed.

Note that the size S may be the size of the image area indicated by the color image information shown in FIG. 2B, or may be the size of the image area indicated by the depth information. For example, when using the color image information, a hue range corresponding to the color of the hand (color of the skin) is set, and whether or not the color of each pixel position of the color image information falls within the hue range is determined. The size S is calculated by calculating the number of pixels for which the hue value falls within the hue range. When using the depth information, a depth range corresponding to the depth value of the hand is set, and whether or not the depth value of each pixel position of the depth information falls within the depth range is determined. The size S is calculated by calculating the number of pixels for which the depth value falls within the depth range.

Figure 10A:
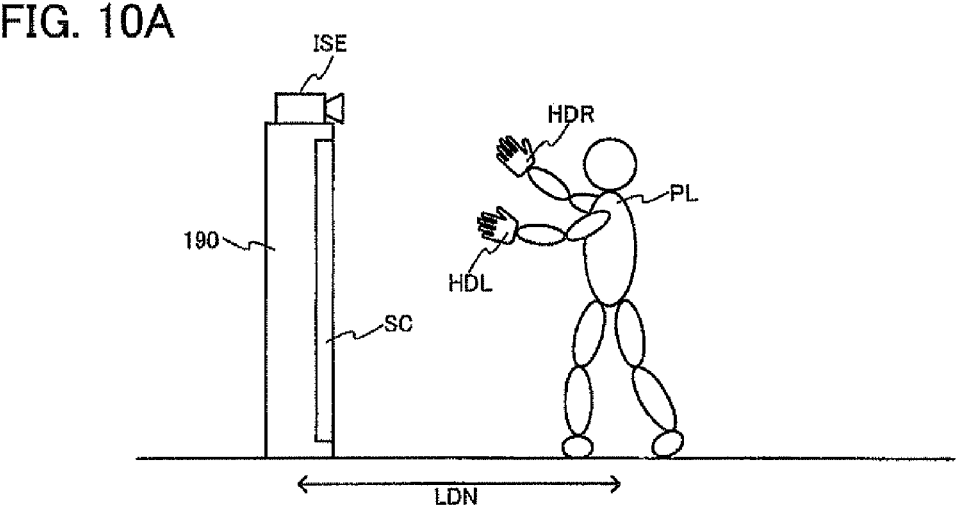
FIGS. 10A to 10C are views illustrative of a method that changes a determination threshold value based on distance.
Figure 10B:
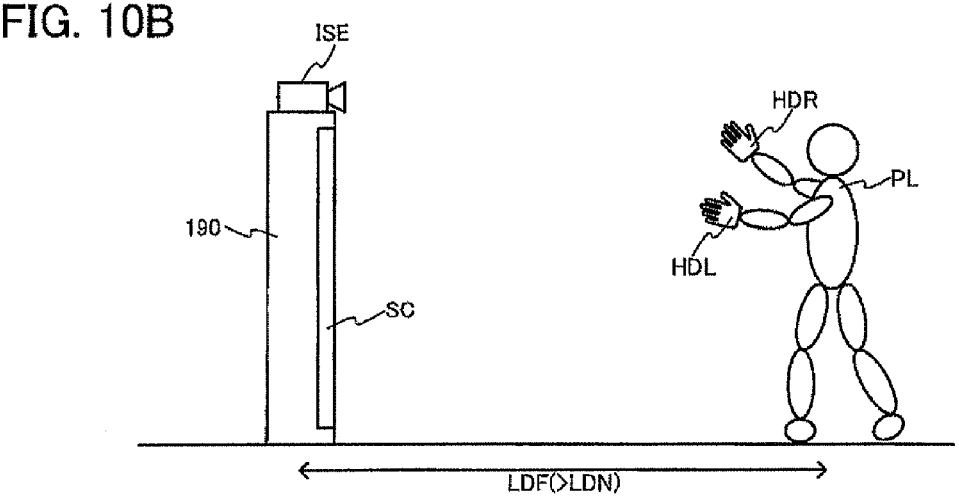

The size S of the image area of the hand of the player differs between the case where the player PL has approached the display section 190 (see FIG. 10A) and the case where the player PL has moved away from the display section 190 (see FIG. 10B). For example, the size S increases when the distance between the display section 190 and the player PL is short (LDN) (see FIG. 10A), and decreases when the distance between the display section 190 and the player PL is long (LDF) (see FIG. 10B).

Figure 10C:
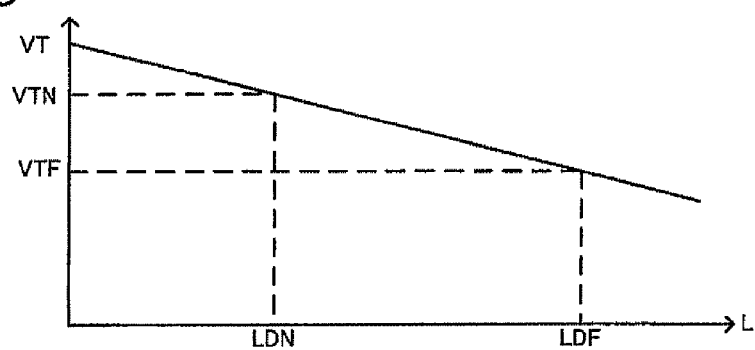

Therefore, the determination threshold value VT used when determining the size S of the image area is changed based on information about the distance between the display section 190 and the player PL. As shown in FIG. 10C, when the distance L between the display section 190 and the player PL is LDN (short distance), the determination threshold value VT is set to VTN (large value), for example. When the distance L between the display section 190 and the player PL is LDF (long distance), the determination threshold value VT is set to VTF (small value). Specifically, the determination threshold value VT is reduced as the distance L increases.

This makes it possible to determine the size S of the image area using an appropriate determination threshold value VT when the player PL has approached the display section 190 (see FIG. 10A) and when the player PL has moved away from the display section 190 (see FIG. 10B). This improves the accuracy of the grasp motion determination process and the grasp-linked motion determination process based on the size S.

In FIG. 10C, the determination threshold value VT is set using the distance L between the display section 190 and the player PL. Note that the determination threshold value VT may be set based on the depth value of the character CH or the hand of the character CH, for example. In this case, the depth value corresponds to the distance information that indicates the distance between the display section 190 and the player PL.

In order to improve the image processing accuracy, it is desirable that the player wear a recognition member for determining whether or not the player has made a grasp motion or a grasp-linked motion, and whether or not the player has made a grasp motion or a grasp-linked motion be determined based on image information about the recognition member.

Figure 11A:
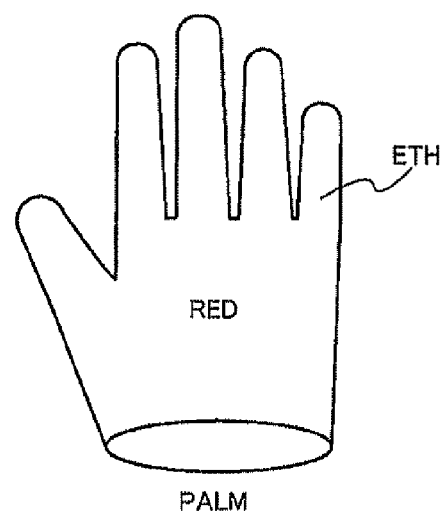
FIGS. 11A and 11B are views illustrative of a glove (recognition member).
Figure 11B:
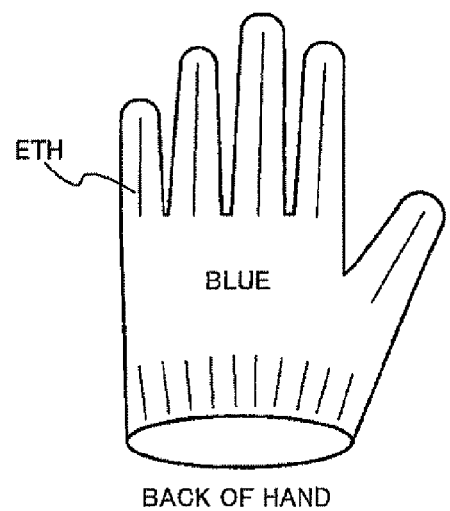

FIGS. 11A and 11B show a glove ETH that is an example of the recognition member. As shown in FIG. 11A, the palm side of the glove ETH (recognition member in a broad sense) is red (first color in a broad sense). As shown in FIG. 11B, the back side of the glove ETH is blue (second color in a broad sense). This makes it possible to easily determine whether the player faces the palm or the back of the hand toward the display section 190.

Figure 12A:
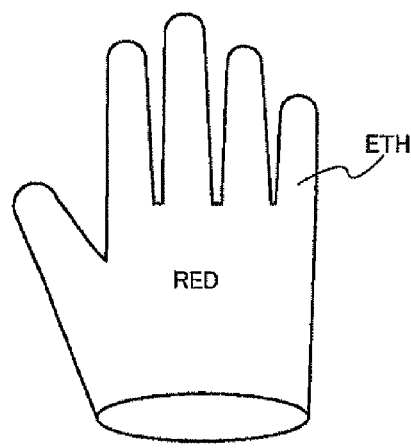
FIGS. 12A to 12D are views illustrative of a determination method using a recognition member.
Figure 12B:
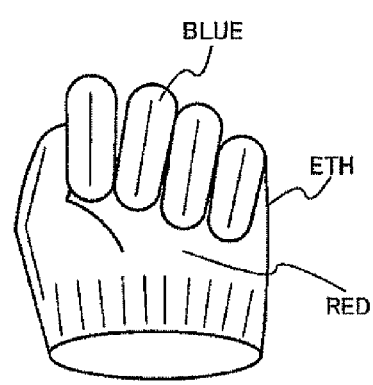

FIG. 12A shows a state in which the hand sheathed in the glove ETH is flat. In this case, most of the image area of the hand is occupied by red (i.e., the color of the palm side of the glove ETH). FIG. 12B shows a state in which the player has clenched the hand. In this case, a first region of the image area of the hand is occupied by red (i.e., the color of the palm side of the glove ETH), and a second region of the image area of the hand is occupied by blue (i.e., the color of the back side of the glove ETH).

Figure 12C:
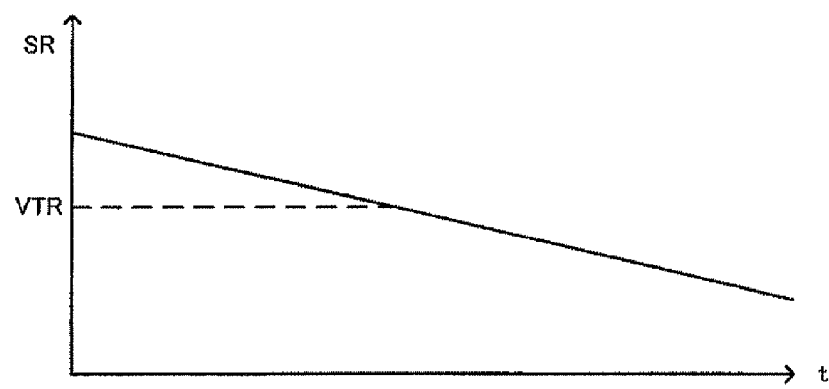

Therefore, it is determined that the player has made a grasp motion when it has been determined that the player has made a grasp preparation motion, and the size SR of the image area in red (first color (i.e., the color of the palm side of the glove ETH)) has decreased, as shown in FIG. 12C. Specifically, it is determined that the player has made a grasp motion when the size SR has decreased to a value smaller than a determination threshold value VTR.

Figure 12D:
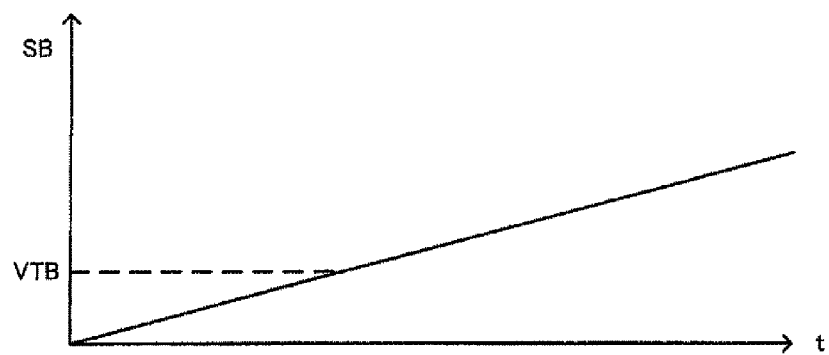

Note that it may be determined that the player has made a grasp motion when the size SB of the image area in blue (second color (i.e., the color of the back side of the glove ETH)) has increased, as shown in FIG. 12D. Specifically, it may be determined that the player has made a grasp motion when the size SB has increased to a value larger than a determination threshold value VTB.

The following problem may occur when using the method described with reference to FIGS. 12A to 12D.

Figure 13A:
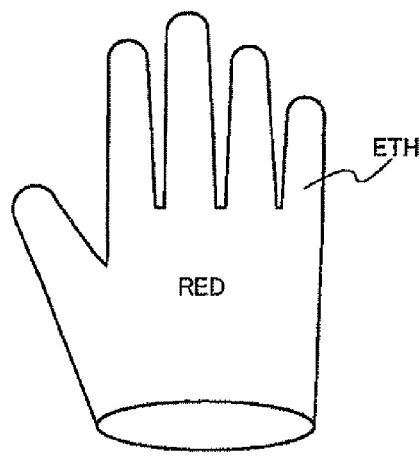
FIGS. 13A to 13C are views illustrative of a problem that occurs in connection with a determination method using a recognition member.
Figure 13B:
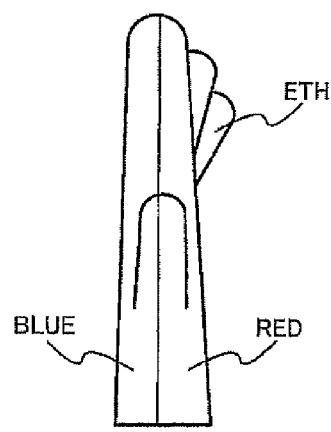
Figure 13C:
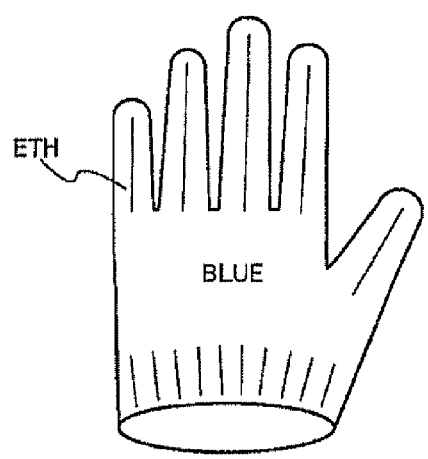

For example, when the player may rotate the hand as shown in FIGS. 13A to 13C. In FIG. 13A, the palm of the hand faces the display section 190 (image sensor). In FIG. 13B, the thumb side of the hand faces the display section 190. In FIG. 13C, the back of the hand faces the display section 190.

The red size SR decreased when the player has rotated the hand as shown in FIG. 13B. Therefore, a determination error occurs when the red size SR has decreased to a value smaller than the determination threshold value VTR (see FIG. 12C) due to rotation. Specifically, it is determined that the player has made a grasp motion as shown in FIGS. 12A and 12B when the player has rotated the hand as shown in FIGS. 13A to 13C. A determination error similarly occurs when the blue size SB has increased to a value larger than the determination threshold value VTB (see FIG. 12D).

Figure 14A:
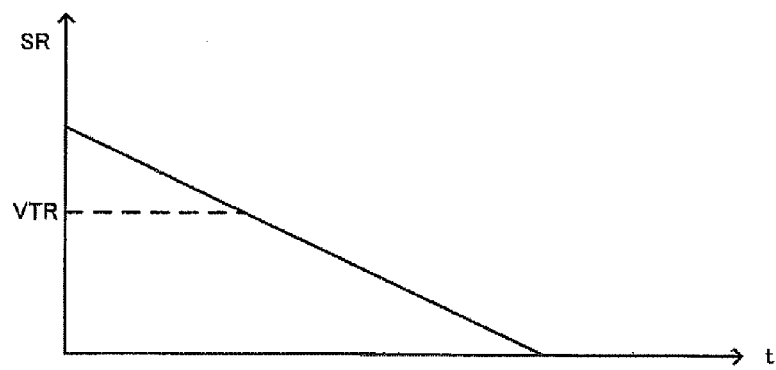
FIGS. 14A to 14C are views illustrative of a determination method using a recognition member.
Figure 14B:
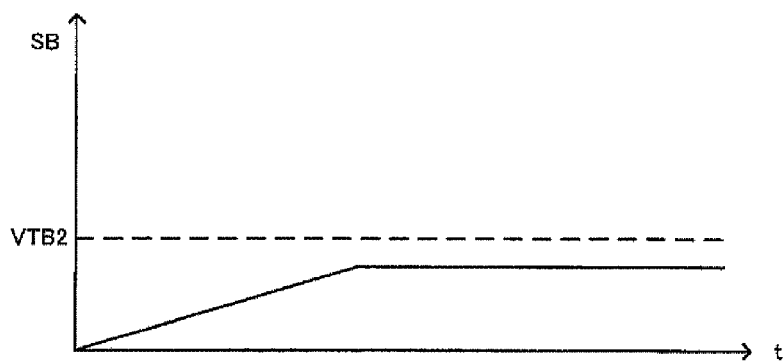
Figure 14C:
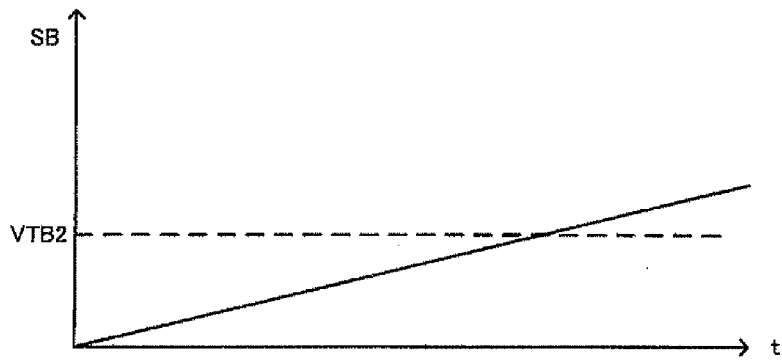

This problem can be solved by determining that the player has made a grasp motion when it has been determined that the player has made a grasp preparation motion, the size SR of the image area in red (first color) has decreased to a value smaller than the first determination threshold value VTR, and the blue size SB of the image area in blue (second color) is smaller than a second determination threshold value VTB2, as shown in FIGS. 14A and 14B. This makes it possible to distinguish the case where the player has rotated the hand as shown in FIGS. 13A to 13C from the case where the player has made a grasp motion as shown in FIGS. 12A and 12B.

Specifically, when the player has rotated the hand as shown in FIGS. 13A to 13C, the red size SR decreases (see FIG. 14A), and the blue size SB exceeds the second determination threshold value VTB2 (see FIG. 14B). Therefore, the grasp motion shown in FIGS. 12A and 12B can be reliably determined by detecting that the red size SR has decreased, and the blue size SB has not exceeded the second determination threshold value VTB2.

It is desirable to change the first determination threshold value VTR and the second determination threshold value VTB2 shown in FIGS. 14A and 14B based on the information about the distance between the display section 190 and the player in the same manner as in FIG. 10C. Specifically, the first determination threshold value VTR and the second determination threshold value VTB2 are reduced as the distance L between the display section 190 and the player increases.

This makes it possible to determine the sizes SR and SB of the image area using appropriate determination threshold values VTR and VTB2 even when the distance between the display section 190 and the player has changed, so that the accuracy of the grasp motion determination process can be improved.

The above grasp motion determination process may also be applied to the grasp-linked motion determination process.

For example, the determination process based on the size of the image area described with reference to FIGS. 9A to 9C may also be applied to the grasp-linked motion determination process in addition to the grasp-linked motion determination process. Specifically, when it has been determined that the player has made a grasp motion with one hand, a grasp-linked motion among the first to Mth grasp-linked motions that has been made by the player with the other hand is determined based on the size of the image area corresponding to the other hand. For example, when the size S of the image area is large (see FIG. 9A), it is determined that the player has made an attack motion (grasp-linked motion) with the palm of the other hand (see FIG. 6A). When the size S of the image area is small (see FIG. 9B), it is determined that the player has made a punch motion (grasp-linked motion) with the other hand (see FIG. 6B).

In this case, whether or not the player has made a grasp-linked motion may be determined based on the size of the image area indicated by the color image information, or may be determined based on the size of the image area indicated by the depth information.

When determining whether or not the player has made a grasp-linked motion, it is desirable to change the determination threshold value used when determining the size of the image area based on the information about the distance between the display section 190 that displays the generated image and the player PL, as described with reference to FIGS. 10A to 10C.

The determination process based on the image information about the recognition member described with reference to FIGS. 11A to 14C may also be applied to the grasp-linked motion determination process in addition to the grasp-linked motion determination process. Specifically, a grasp-linked motion among the first to Mth grasp-linked motions that has been made by the player with the other hand is determined based on the image information about the recognition member that is fitted to the hand of the player. For example, when the size SR of the image area in red (first color) is large (see FIG. 12A), it is determined that the player has made an attack motion (grasp-linked motion) with the palm of the other hand (see FIG. 6A). When the size SR of the image area in red has decreased, or the size SB of the image area in blue (second color) has increased (see FIG. 12B), it is determined that the player has made a punch motion (grasp-linked motion) with the other hand (see FIG. 6B).

The color setting of the glove used as the recognition member is not limited to that shown in FIGS. 11A and 11B. Various modifications and variations may be made. Whether or not the player has made a grasp motion or a grasp-linked motion may be determined based on image information about a specific pattern drawn on the glove, for example. The recognition member is not limited to a glove. For example, a ring or the like put on the finger of the player may be used as the recognition member, and whether or not the player has made a grasp motion or a grasp-linked motion may be determined based on image information about the ring or the like.

Whether or not the player has made a grasp motion or a grasp-linked motion may be determined by a hand shape recognition process. Specifically, whether or not the player has made a grasp motion or a grasp-linked motion is determined by a shape recognition process on the image information about the hand of the player that has been determined to have made a grasp preparation motion. For example, it is determined that the player has made a grasp motion when the recognized shape of the hand has changed from the shape shown in FIG. 9A to the shape shown in FIG. 9B. Alternatively, it is determined that the player has made an attack motion (grasp-linked motion) with the palm (see FIG. 6A) when the recognized shape of the hand is the shape shown in FIG. 9A, and it is determined that the player has made a punch motion (grasp-linked motion) (see FIG. 6B) when the recognized shape of the hand is the shape shown in FIG. 9B. In this case, a known image recognition process may be employed as the shape recognition process.

2.3 Grasp-Linked Motion

In this embodiment, a grasp-linked motion among a plurality of grasp-linked motions that has been made by the player PL is determined based on the image information from the image sensor ISE. Specifically, whether the player has made the grasp-linked motion (attack motion with the palm) shown in FIG. 6A or grasp-linked motion (punch motion) shown in FIG. 6B is determined based on the image information from the image sensor ISE that images the player PL.

Therefore, when the player has made the grasp-linked motion shown in FIG. 6A, an image as shown in FIG. 8A can be generated by causing the character to makes a motion corresponding to the grasp-linked motion. When the player has made the grasp-linked motion shown in FIG. 6B, an image as shown in FIG. 8B can be generated by causing the character to makes a motion corresponding to the grasp-linked motion.

Therefore, various grasp-linked motion images can be generated depending on the motion of the player PL. Moreover, since a grasp-linked motion image that conforms to the motion of the player PL can be generated, the player is fully involved in virtual reality.

Whether or not the player has made a grasp-linked motion may be determined based on the skeleton information about the player PL. For example, a grasp-linked motion among a plurality of grasp-linked motions (first to Mth grasp-linked motions) (see FIGS. 6A and 6B) that has been made by the player PL is determined based on the skeleton information about the player PL.

Figure 15:
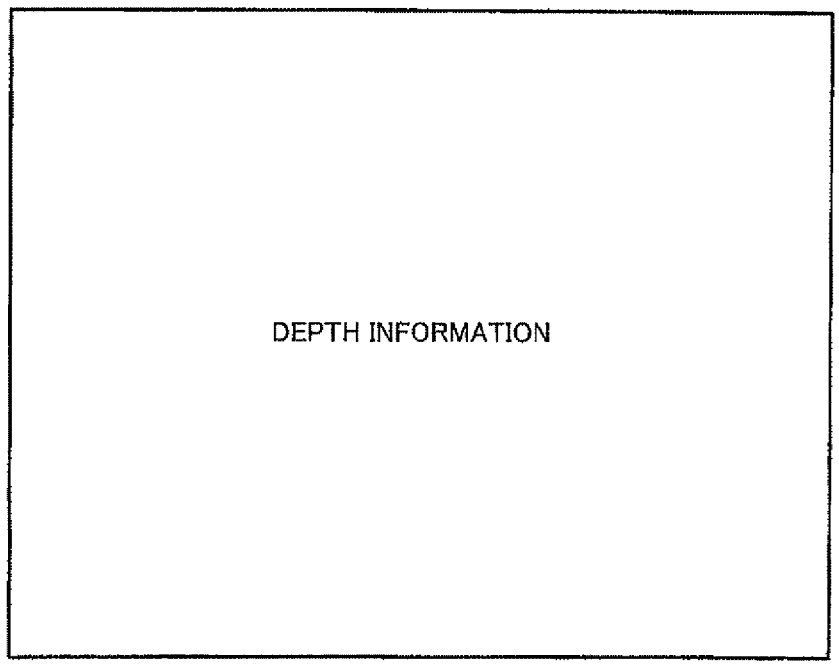
FIG. 15 is a view illustrative of a method that calculates skeleton information about a player based on depth information.
Figure 15:
Figure 15:
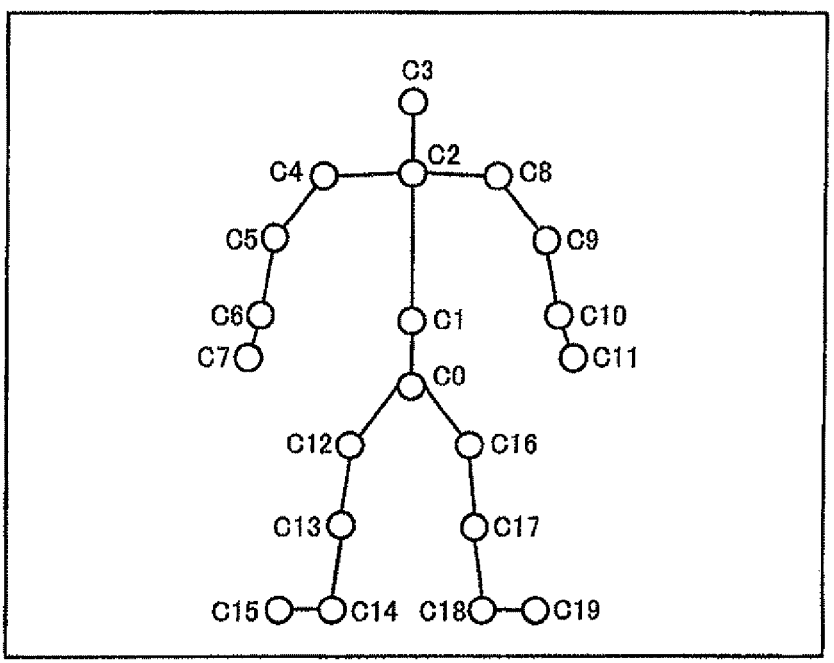

As shown in FIG. 15, skeleton information used to specify the motion of the player PL is acquired based on the image information (e.g., depth information shown in FIG. 2B). In FIG. 15, position information (three-dimensional coordinates) about joints C0 to C19 of a skeleton has been acquired as the skeleton information. The joints C0 to C10 correspond to the joints of the player PL captured by the image sensor ISE. When the whole body of the player PL cannot be captured by the image sensor ISE, the skeleton information that includes the position information about only the joints in the captured area is generated.

For example, the three-dimensional shape of the player PL or the like viewed from the image sensor ISE can be acquired using the depth information shown in FIG. 2B. The area of part (e.g., face) of the player PL can be specified by face image recognition or the like when using the color image information in combination with the depth information. Therefore, each part of the player PL and the joint position of each part are estimated based on the three-dimensional shape information and the like. The three-dimensional coordinate information about the joint position of the skeleton is calculated based on the two-dimensional coordinates of the pixel position of the depth information corresponding to the estimated joint position, and the depth information set to the pixel position to acquire the skeleton information shown in FIG. 15.

The motion (e.g., gesture) of the player PL can be specified in real time by utilizing the skeleton information, so that a novel operation interface environment can be implemented. Moreover, the skeleton information has high compatibility with the motion data about the character disposed in the object space. Therefore, the character can be caused to make a motion in the object space by utilizing the skeleton information as the motion data, for example.

In this embodiment, whether or not the player has made a grasp-linked motion is determined using the skeleton information shown in FIG. 15.

Figure 16A:
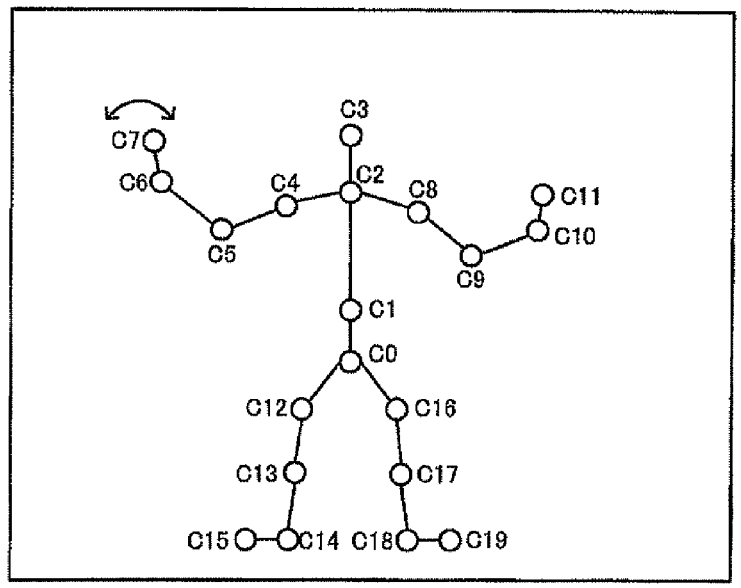
FIGS. 16A and 16B are views illustrative of a method that determines whether or not the player has made a grasp-linked motion using skeleton information about the player.
Figure 16B:
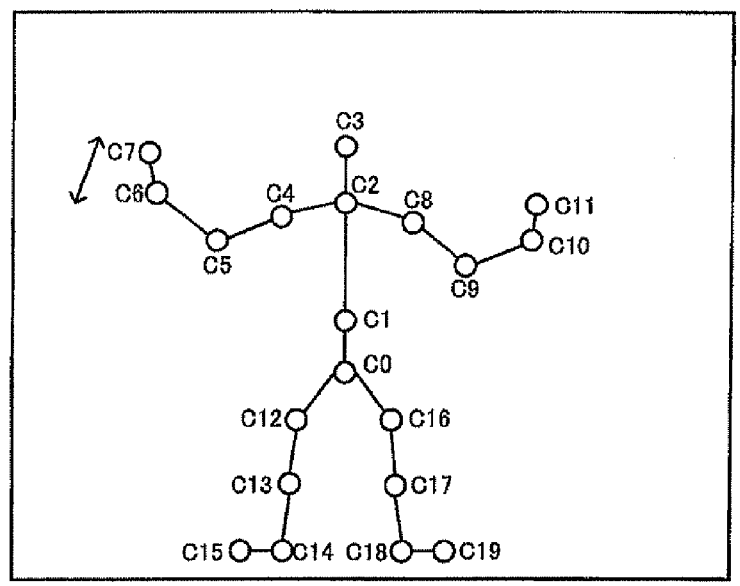

FIG. 16A shows an example of skeleton information obtained by capturing the player PL who has made the grasp-linked motion shown in FIG. 6A using the image sensor ISE. FIG. 16B shows an example of skeleton information obtained by capturing the player PL who has made the grasp-linked motion as shown in FIG. 6B using the image sensor ISE.

As shown in FIGS. 16A and 16B, whether the player PL has made the grasp-linked motion shown in FIG. 6A or the grasp-linked motion shown in FIG. 6B can be determined using the position information about the joints C0 to C19 included in the skeleton information.

For example, it can be determined that the player PL has made the grasp-linked motion (attack motion) shown in FIG. 6A with the palm of the right hand HDR by detecting a change in the position of the joints C7 and C6 shown in FIG. 16A corresponding to the right hand HDR shown in FIG. 6A. It can be determined that the player PL has made the grasp-linked motion (punch motion) shown in FIG. 6B with the right hand HDR by detecting a change in the position of the joints C7 and C6 shown in FIG. 16B corresponding to the right hand HDR shown in FIG. 6B.

When the skeleton information shown in FIG. 16A has been detected, the image shown in FIG. 8A is generated as an image of the grasp-linked motion shown in FIG. 6A. When the skeleton information shown in FIG. 16B has been detected, the image shown in FIG. 8B is generated as an image of the grasp-linked motion shown in FIG. 6B.

A more accurate and appropriate determination process can be implemented by determining whether or not the player has made a grasp-linked motion using the skeleton information obtained based on the depth information. Moreover, whether or not the player has made a grasp-linked motion can be determined by effectively utilizing the skeleton information used to reproduce the motion of the character, for example.

The above motion determination process based on the skeleton information may also be applied to the grasp preparation motion determination process described with reference to FIGS. 3A and 3B, for example.

In this embodiment, the image processing area may be set using the skeleton information acquired as shown in FIG. 15.

Figure 17A:
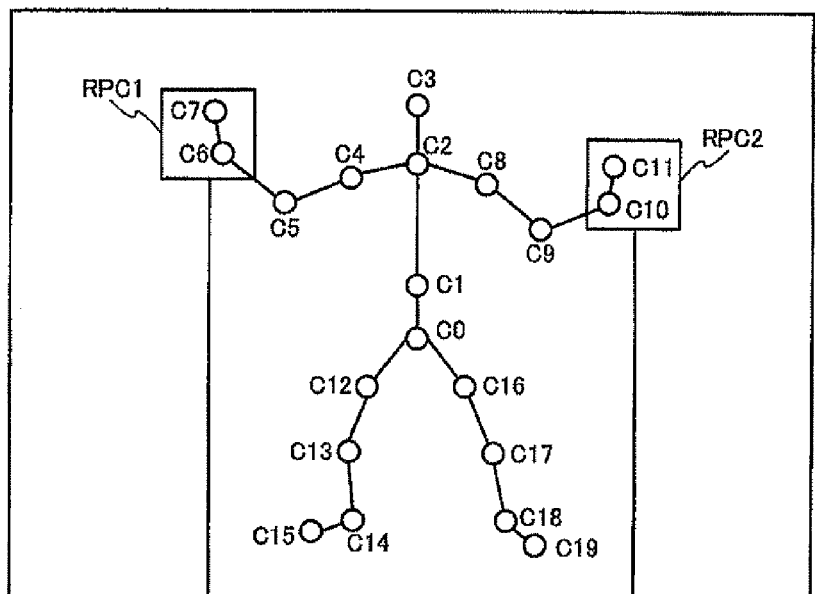
FIGS. 17A and 17B are views illustrative of a method that sets an image processing area using skeleton information about the player.

For example, when it has been determined that the player has made a grasp motion with the left hand (one hand), an image area including the positions of the joints C7 and C6 corresponding to the right hand (the other hand) of the player PL is set as an image processing area RPC1 (see FIG. 17A). The depth information and the color image information about the processing area RPC1 are subjected to image processing for determining whether or not the player has made a grasp-linked motion. Specifically, the processing area RPC1 is subjected to image processing that calculates the size of the image area described with reference to FIGS. 9A to 14C. Alternatively, the hand shape recognition process for determining whether or not the player has made a grasp-linked motion is performed on the processing area RPC1.

This makes it unnecessary to perform image processing on the entire area (i.e., it suffices to perform image processing on the processing area RPC1 that is smaller than the screen size). Therefore, the processing load imposed by image processing can be reduced, and image processing for determining whether or not the player has made a grasp-linked motion can be performed with a reduced processing load.

Figure 17B:
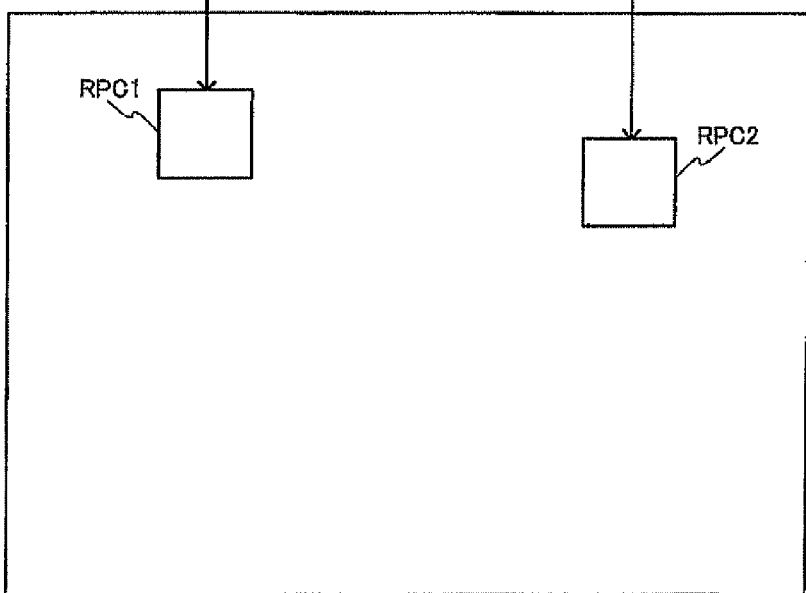

The above image processing area setting process based on the skeleton information may also be applied to the grasp motion determination process in addition to the grasp-linked motion determination process. For example, when it has been determined that the player has made a grasp preparation motion with the left hand based on the skeleton information about the player PL, an image area including the positions of the joints C11 and C10 corresponding to the left hand HDL of the player PL is set as an image processing area RPC2 (see FIGS. 17A and 17B). The depth information and the color image information about the processing area RPC2 are subjected to image processing for determining whether or not the player has made a grasp motion. Specifically, the processing area RPC2 is subjected to image processing that calculates the size of the image area described with reference to FIGS. 9A to 14C. Alternatively, the hand shape recognition process for determining whether or not the player has made a grasp motion is performed on the processing area RPC2. Therefore, image processing for determining whether or not the player has made a grasp motion can be performed with a reduced processing load.

2.4 Attack Calculation Process

In this embodiment, whether or not the player has made an attack motion with the other hand as the grasp-linked motion is determined based on the image information from the image sensor ISE (see FIGS. 7A to 8B). In FIGS. 7A and 8A, whether or not the player has made an attack motion with the palm of the other hand is determined. In FIGS. 7B and 8B, whether or not the player has made a punch motion is determined.

In this case, it is desirable to set an attack calculation parameter of the attack motion with the other hand based on the image information from the image sensor ISE, and perform the attack calculation process based on the attack calculation parameter.

For example, when the player has made an attack motion with the palm of the right hand HDR (the other hand), the wave speed and the wave width of the right hand HDR are detected based on the image information about the right hand HDR. When the wave speed and the wave width are high (large), an attack capability parameter (attack calculation parameter) is increased. This increases the amount of damage applied to the opposing character due to an attack motion with the palm of the hand. When the wave speed and the wave width are low (small), the attack capability parameter is reduced. This reduces the amount of damage applied to the opposing character due to an attack motion with the palm of the hand.

The image information can be effectively utilized by utilizing the image information from the image sensor ISE when setting the attack calculation parameter in addition to the case of determining whether or not the player has made a grasp motion or a grasp-linked motion. Moreover, the amount of damage applied to the opposing character increases based on the speed and the amount of the motion of the hand of the player PL. Therefore, the motion (movement) of the player is more effectively reflected in the game, so that the player is fully involved in virtual reality.

FIG. 18 shows an example of table data in which the attack calculation parameter is linked to each grasp-linked motion pattern. For example, an attack A is linked to a grasp-linked motion pattern PA. The attack capability parameter and the stiff time parameter of the attack A are linked to the grasp-linked motion pattern PA. An attack B is linked to a grasp-linked motion pattern PB. The attack capability parameter and the stiff time parameter of the attack B are linked to the grasp-linked motion pattern PB. The stiff time parameter is one of the attack calculation parameters. The stiff time parameter indicates the time for which the opposing character is stiffened when attacked by the player. It is possible to determine the grasp-linked motion pattern based on the skeleton information, and perform the attack calculation process using the attack calculation parameter linked to the determined pattern by providing the table data shown in FIG. 18, for example.

2.5 Specific Process Example

Figure 19:
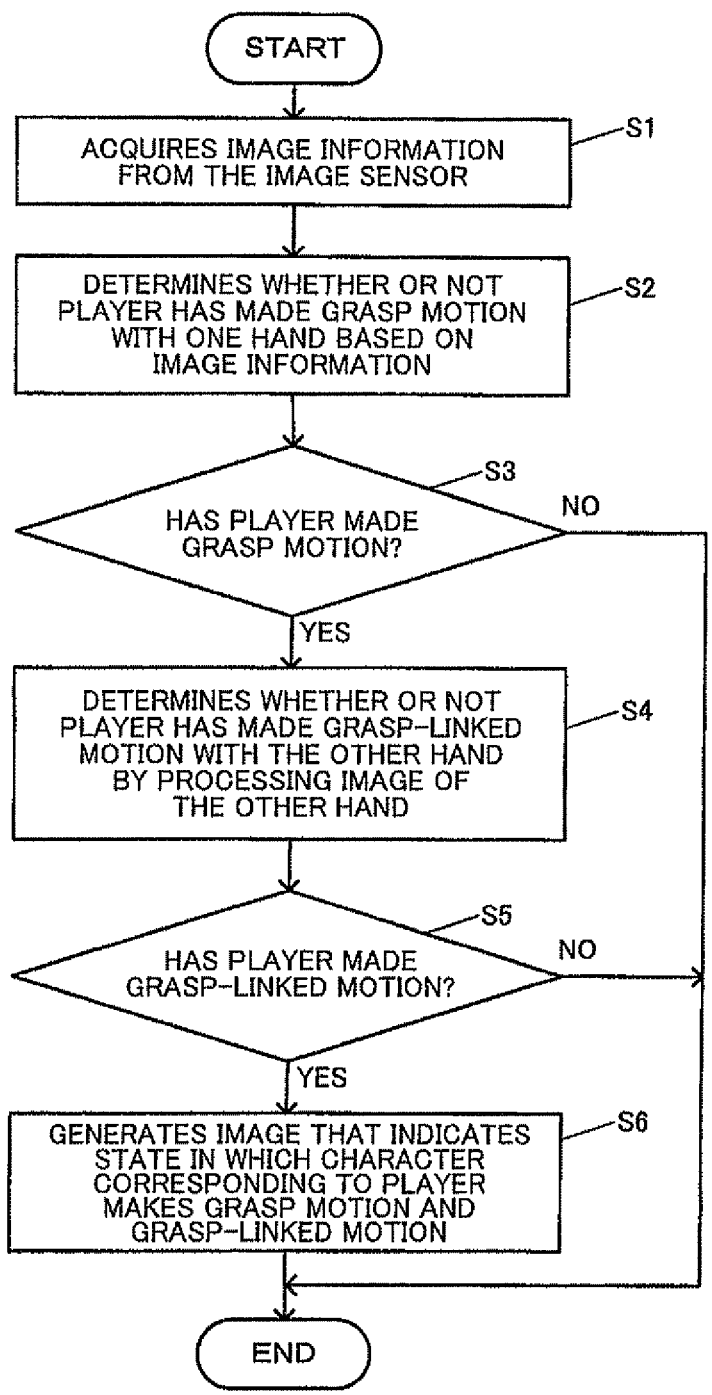
FIG. 19 is a flowchart illustrative of a process according to one embodiment of the invention.

A specific process example according to this embodiment is described below using flowcharts shown in FIGS. 19 and 20. FIG. 19 is a flowchart showing an overall process according to this embodiment.

The image information is acquired from the image sensor (see FIGS. 2A and 2B) (step S1). Whether or not the player PL has made a grasp motion (see FIGS. 4A and 4B) with one hand is determined based on the acquired image information (step S2).

When it has been determined that the player PL has made a grasp motion (step S3), whether or not the player has made a grasp-linked motion (see FIGS. 6A to 7B) with the other hand is determined by processing the image of the other hand, for example (step S4). When it has been determined that the player PL has made a grasp-linked motion (step S5), an image that indicates a state in which the character corresponding to the player makes a grasp motion and a grasp-linked motion is generated (see FIGS. 8A and 8B) (step S6).

Figure 20:
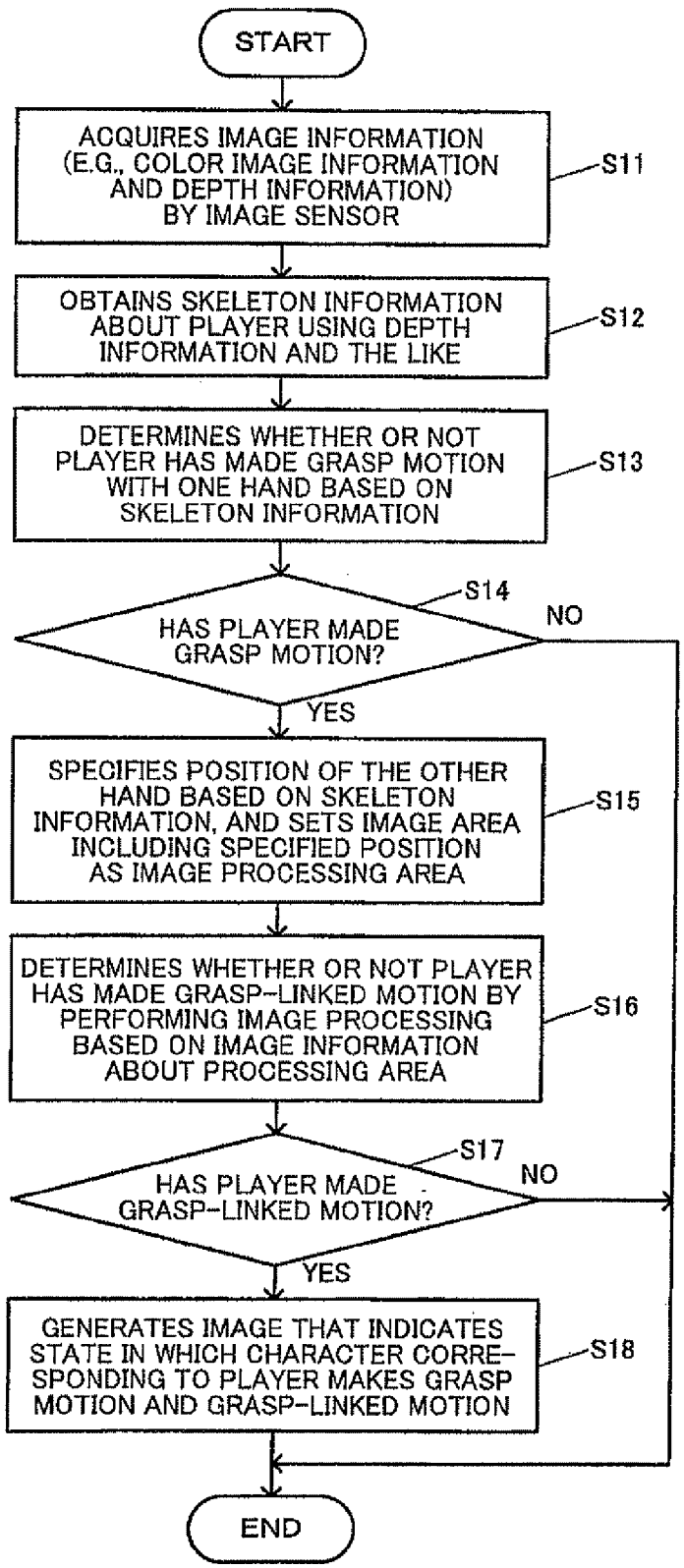
FIG. 20 is a flowchart illustrative of a process according to one embodiment of the invention.

FIG. 20 is a flowchart showing a process that determines whether or not the player has made a grasp motion or a grasp-linked motion using the skeleton information about the player.

The image information (e.g., color image information and depth information) is acquired by the image sensor (see FIGS. 2A and 2B) (step S11). The skeleton information about the player is calculated using the acquired depth information and the like (see FIG. 15) (step S12). Whether or not the player has made a grasp motion with one hand is determined based on the skeleton information (step S13). Specifically, whether or not the player has made a grasp preparation motion with one hand is determined based on the skeleton information and whether or not the player has made a grasp motion with the one hand is determined when it has been determined that the player has made a grasp preparation motion.

When it has been determined that the player has made a grasp motion (step S14), the position of the other hand is specified based on the skeleton information, and an image area including the specified position is set as the image processing area (see FIGS. 17A and 17B) (step S15). Whether or not the player has made a grasp-linked motion is then determined by performing image processing based on the image information about the processing area (step S16).

When it has been determined that the player has made a grasp-linked motion (step S17), an image that indicates a state in which the character corresponding to the player makes a grasp motion and a grasp-linked motion is generated (see FIGS. 8A and 8B) (step S18).

Although some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings. The method of determining whether or not the player has made a grasp motion, a grasp-linked motion, or a grasp preparation motion based on the image information, the determination method based on the size of the image area, the skeleton information acquisition method, and the like are not limited to those described in connection with the above embodiments. Methods equivalent thereto are intended to be included within the scope of the invention. The invention may be applied to various games. The invention may be applied to various image generation systems such as an arcade game system, a consumer game system, a large-scale attraction system in which a number of players participate, a simulator, a multimedia terminal, a system board that generates a game image, and a mobile phone.

What is claimed is:

1. An image generation system comprising:
    a memory configured to store instructions; and
    at least one processor configured to execute the instructions to:
        acquire image information from an image sensor;
        determine whether or not a player has made a grasp preparation motion based on the image information, the processor processing an image corresponding to a hand of the player that has made the grasp preparation motion when the processor has determined that the player has made the grasp preparation motion;
        determine whether or not the player has made a grasp motion that follows the grasp preparation motion with one hand that is a right hand or a left hand based on the image information;
        determine whether or not the player has made a grasp-linked motion with the other hand based on the image information when the at least one processor has determined that the player has made the grasp motion with the one hand, the grasp-linked motion being a motion that follows the grasp motion; and
        generate an image based on the determination results of the grasp motion and the grasp-linked motion.

2. The image generation system as defined in claim 1, the at least one processor determining the grasp-linked motion among first to Mth grasp-linked motions (M is an integer equal to or larger than 2) that has been made by the player with the other hand based on the image information from the image sensor.

3. The image generation system as defined in claim 2, the at least one processor determining the grasp-linked motion among the first to Mth grasp-linked motions that has been made by the player with the other hand based on information about an image area corresponding to the other hand.

4. The image generation system as defined in claim 3, the at least one processor determining the grasp-linked motion among the first to Mth grasp-linked motions that has been made by the player with the other hand based on the information about the image area within a given period or at a given timing.

5. The image generation system as defined in claim 3, the at least one processor determining the grasp-linked motion among the first to Mth grasp-linked motions that has been made by the player with the other hand based on a size of the image area.

6. The image generation system as defined in claim 5, the at least one processor acquiring color image information as the image information, the color image information being image information in which a color value is set to each pixel position; and
the at least one processor determining the grasp-linked motion among the first to Mth grasp-linked motions that has been made by the player with the other hand based on the size of the image area corresponding to the other hand in the color image information.

7. The image generation system as defined in claim 5, the at least one processor acquiring depth image information as the image information, the depth information being image information in which a depth value is set to each pixel position; and
the at least one processor determining the grasp-linked motion among the first to Mth grasp-linked motions that has been made by the player with the other hand based on the size of the image area corresponding to the other hand in the depth information.

8. The image generation system as defined in claim 5, the at least one processor changing a determination threshold value used when determining the size of the image area based on information about a distance between a display section that displays the generated image and the player.

9. The image generation system as defined in claim 2, the at least one processor determining the grasp-linked motion among the first to Mth grasp-linked motions that has been made by the player with the other hand based on image information about a recognition member that is fitted to the hand of the player.

10. The image generation system as defined in claim 2, the at least one processor determining the grasp-linked motion among the first to Mth grasp-linked motions that has been made by the player with the other hand by a shape recognition process on image information about the other hand.

11. The image generation system as defined in claim 2, the processor further configured to execute instructions to:
    acquire skeleton information based on the image information from the image sensor, the skeleton information specifying a motion of the player viewed from the image sensor,
    the at least one processor determining the grasp-linked motion among the first to Mth grasp-linked motions that has been made by the player with the other hand based on the skeleton information.

12. The image generation system as defined in claim 1, the processor further configured to execute instructions to:
    acquire skeleton information based on the image information from the image sensor, the skeleton information specifying a motion of the player viewed from the image sensor,
    the at least one processor determining whether or not the player has made the grasp-linked motion with the other hand based on the skeleton information.

13. The image generation system as defined in claim 1, the processor further configured to execute instructions to:

acquire skeleton information based on the image information from the image sensor, the skeleton information specifying a motion of the player viewed from the image sensor, the at least one processor setting an image processing area for determining whether or not the player has made the grasp motion or the grasp-linked motion based on the acquired skeleton information.

14. The image generation system as defined in claim 1, the processor further configured to execute instructions to:
control a character corresponding to the player,
the at least one processor generating an image that indicates a state in which the character makes the grasp motion and the grasp-linked motion when it has been determined that the player has made the grasp motion and the grasp-linked motion.

15. The image generation system as defined in claim 1,
the at least one processor determining whether or not the player has made an attack motion with the other hand as the grasp-linked motion based on the image information from the image sensor.

16. The image generation system as defined in claim 15, the at least one processor further configured to execute instructions to:
set an attack calculation parameter of the attack motion with the other hand based on the image information from the image sensor, and performs an attack calculation process based on the attack calculation parameter.

17. The image generation system as defined in claim 1,
the at least one processor determining whether or not the player has made the grasp motion based on information about an image area corresponding to the hand of the player that has been determined to have made the grasp preparation motion.

18. The image generation system as defined in claim 17,
the at least one processor determining whether or not the player has made the grasp motion based on the information about the image area within a given period or at a given timing.

19. The image generation system as defined in claim 17,
the at least one processor determining whether or not the player has made the grasp motion based on a size of the image area.

20. The image generation system as defined in claim 19,
the at least one processor changing a determination threshold value used when determining the size of the image area based on information about a distance between a display section that displays the generated image and the player.

21. The image generation system as defined in claim 1,
the at least one processor determining whether or not the player has made the grasp motion based on image information about a recognition member that is fitted to the hand of the player.

22. The image generation system as defined in claim 1,
the at least one processor determining whether or not the player has made the grasp motion by a shape recognition process on image information about the hand of the player that has been determined to have made the grasp preparation motion.

23. The image generation system of defined in claim 1, wherein whether the player has made the grasp-linked motion with the other hand is determined by specifying an area corresponding to the other hand based on the skeleton information and subjecting the specified area to image processing.

24. An image generation method comprising:
acquiring image information from an image sensor using at least one processor;
determining whether or not a player has made a grasp preparation motion based on the image information, the processor processing an image corresponding to a hand of the player that has made the grasp preparation motion when the processor has determined that the player has made the grasp preparation motion;
determining whether or not the player has made a grasp motion that follows the grasp preparation motion with one hand that is a right hand or a left hand based on the image information;
determining whether or not the player has made a grasp-linked motion with the other hand based on the image information when it has been determined that the player has made the grasp motion with the one hand, the grasp-linked motion being a motion that follows the grasp motion; and
generating an image based on the determination results of the grasp motion and the grasp-linked motion.

25. The image generation method as defined in claim 24, wherein the determining step includes determining whether the player has made the grasp-linked motion with the other hand by specifying an area corresponding to the other hand based on the skeleton information and subjecting the specified area to image processing.

26. A non-transitory computer-readable information storage medium storing a program that causes a computer to execute image generation steps, comprising:
acquiring image information from an image sensor;
determining whether or not a player has made a grasp preparation motion based on the image information, the processor processing an image corresponding to a hand of the player that has made the grasp preparation motion when the processor has determined that the player has made the grasp preparation motion;
determining whether or not the player has made a grasp motion that follows the grasp preparation motion with one hand that is a right hand or a left hand based on the image information;
determining whether or not the player has made a grasp-linked motion with the other hand based on the image information when it has been determined that the player has made the grasp motion with the one hand, the grasp-linked motion being a motion that follows the grasp motion; and
generating an image based on the determination results of the grasp motion and the grasp-linked motion.

27. The non-transitory computer readable information storage medium as defined in claim 26, wherein the determining step includes determining whether the player has made the grasp-linked motion with the other hand by specifying an area corresponding to the other hand based on the skeleton information and subjecting the specified area to image processing.

28. An image generation system comprising:
a memory configured to store instructions; and
at least one processor configured to execute the instructions to:
acquire image information from an image sensor;
determine whether or not a player has made a grasp motion with one hand that is a right hand or a left hand based on the image information;
determine whether or not the player has made a grasp-linked motion with the other hand based on the image information when the at least one processor has determined that the player has made the grasp motion with the one hand, the grasp-linked motion being a motion that follows the grasp motion and being formed by: (i) making the other hand flat, or (ii) making the other hand clench into a fist; and generate an image based on the determination results of the grasp motion and the grasp-linked motion.

29. An image generation method comprising:

acquiring image information from an image sensor using at least one processor;

determining whether or not a player has made a grasp motion with one hand that is a right hand or a left hand based on the image information;

determining whether or not the player has made a grasp-linked motion with the other hand based on the image information when it has been determined that the player has made the grasp motion with the one hand, the grasp-linked motion being a motion that follows the grasp motion and being formed by: (i) making the other hand flat, or (ii) making the other hand clench into a fist; and generating an image based on the determination results of the grasp motion and the grasp-linked motion.

30. A non-transitory computer-readable information storage medium storing a program that causes a computer to execute image generation steps, comprising:

acquiring image information from an image sensor;

determining whether or not a player has made a grasp motion with one hand that is a right hand or a left hand based on the image information;

determining whether or not the player has made a grasp-linked motion with the other hand based on the image information when it has been determined that the player has made the grasp motion with the one hand, the grasp-linked motion being a motion that follows the grasp motion and being formed by: (i) making the other hand flat, or (ii) making the other hand clench into a fist; and generating an image based on the determination results of the grasp motion and the grasp-linked motion.

* * * * *